(12) United States Patent
Giraldes

(10) Patent No.: US 12,213,462 B2
(45) Date of Patent: Feb. 4, 2025

(54) MUSHROOM FOREST ARTIFICIAL REEF

(71) Applicant: QATAR UNIVERSITY, Doha (QA)

(72) Inventor: Bruno Welter Giraldes, Doha (QA)

(73) Assignee: QATAR UNIVERSITY, Doha (QA)

( * ) Notice: Subject to any disclaimer, the term of this patent is extended or adjusted under 35 U.S.C. 154(b) by 38 days.

(21) Appl. No.: 16/256,982

(22) Filed: Jan. 24, 2019

(65) Prior Publication Data
US 2020/0236911 A1     Jul. 30, 2020

(51) Int. Cl.
*A01K 61/73*     (2017.01)
*A01K 61/78*     (2017.01)

(52) U.S. Cl.
CPC .............. *A01K 61/73* (2017.01); *A01K 61/78* (2017.01)

(58) Field of Classification Search
CPC ........ A01K 61/73; A01K 61/78; A01K 61/70; E02B 3/046
See application file for complete search history.

(56) References Cited

U.S. PATENT DOCUMENTS

| | | | |
|---|---|---|---|
| 3,896,624 A | 7/1975 | Chang | |
| 4,130,994 A * | 12/1978 | Van, Jr. | E02B 3/046 405/27 |
| 4,563,972 A * | 1/1986 | Poppe | B63B 21/20 114/293 |
| 4,727,672 A * | 3/1988 | Hill | A41G 1/00 43/4 |
| 4,997,311 A | 3/1991 | Van Doren | |
| 5,102,257 A | 4/1992 | Creter | |
| 5,215,406 A | 6/1993 | Hudson | |
| 5,507,594 A | 4/1996 | Speicher | |
| 5,908,265 A | 6/1999 | Mostkoff | |
| 6,089,191 A * | 7/2000 | Calinski | A01K 61/70 119/221 |
| 6,186,702 B1 * | 2/2001 | Bartkowski | A01K 61/70 119/221 |
| 6,431,792 B1 | 8/2002 | Barnes | |

(Continued)

FOREIGN PATENT DOCUMENTS

| | | |
|---|---|---|
| CN | 105941222 A | 9/2016 |
| CN | 205623888 U | 10/2016 |

(Continued)

OTHER PUBLICATIONS

Machine English translation of JPH01179634 (attached) (Year: 1989).*

(Continued)

*Primary Examiner* — Peter M Poon
*Assistant Examiner* — Marisa V Conlon
(74) *Attorney, Agent, or Firm* — SQUIRE PATTON BOGGS (US) LLP

(57) ABSTRACT

Embodiments of the present invention are directed to articles used as an artificial reef and/or used as a part of an artificial reef, methods of making the articles, methods of using the articles, and methods of forming artificial reefs. The articles include a top, at least one support member, and optionally, a base. In some embodiments, the water permeability of the top of the article is greater (and in some embodiments, at least 10% greater) than the water permeability of the support, the water permeability of the optional base, or both. In preferred embodiments, the top, support(s), and optional base are formed of concrete.

14 Claims, 6 Drawing Sheets

(56) References Cited

U.S. PATENT DOCUMENTS

| | | | | |
|---|---|---|---|---|
| 6,824,327 | B1 * | 11/2004 | Walter | A01K 61/70 405/33 |
| 6,978,735 | B1 * | 12/2005 | Yeager | A01K 61/70 119/221 |
| 7,513,711 | B1 | 4/2009 | Walter | |
| 7,827,937 | B1 * | 11/2010 | Walter | E02B 3/046 119/221 |
| 7,828,493 | B1 * | 11/2010 | Brignac | A01K 61/70 405/24 |
| 7,997,231 | B2 | 8/2011 | Fernandez | |
| 7,997,311 | B2 | 8/2011 | Prout | |
| 8,147,165 | B2 * | 4/2012 | Sung | A01G 33/00 405/25 |
| 8,640,651 | B2 * | 2/2014 | Ewald | A01K 61/70 119/221 |
| 9,403,287 | B2 * | 8/2016 | Hilton | B28B 7/18 |
| 9,498,901 | B1 | 11/2016 | Hilton | |
| 9,560,838 | B1 * | 2/2017 | King | A01K 97/01 |
| 9,744,687 | B2 * | 8/2017 | Hilton | B28B 7/18 |
| 9,832,979 | B2 | 12/2017 | Kabiling, Jr. et al. | |
| 10,138,610 | B2 * | 11/2018 | Hilton | A01K 61/70 |
| 10,602,725 | B1 * | 3/2020 | Ewald | A01K 61/70 |
| 11,434,615 | B2 * | 9/2022 | Lee | E02B 3/12 |
| 2005/0022749 | A1 | 2/2005 | Amblard | |
| 2006/0056914 | A1 * | 3/2006 | Arai | A01K 61/70 405/30 |
| 2013/0118413 | A1 * | 5/2013 | Bennett | A01K 61/77 119/200 |
| 2015/0230434 | A1 | 8/2015 | Manning | |
| 2017/0112106 | A1 * | 4/2017 | Marsden | A01K 61/78 |
| 2017/0268191 | A1 | 9/2017 | Klenert | |
| 2018/0317462 | A1 * | 11/2018 | Dounas | E02B 3/046 |

FOREIGN PATENT DOCUMENTS

| | | | | |
|---|---|---|---|---|
| FR | 2807454 | A1 * | 10/2001 | A01K 61/70 |
| FR | 3020240 | A1 * | 10/2015 | A01K 61/006 |
| JP | H01179634 | * | 7/1989 | |
| JP | 2005/143457 | A | 6/2005 | |
| KR | 10-0770601 | B1 | 10/2007 | |
| KR | 20130084045 | | 7/2013 | |
| WO | WO2006108898 | * | 10/2006 | |

OTHER PUBLICATIONS

Machine English translation of WO 2006/108898 (attached) (Year: 2006).*

International Search Report and Written Opinion mailed Aug. 4, 2020 for International Application No. PCT/IB20/50549; 11 pages.

Fabi et al.: "Overview on Artificial Reefs in Europe", *Brazilian Journal of Oceanography*, 59 (special issue CARAH), 2011, pp. 155-166.

The Reef Ball Foundation-Designed Artificial Reefs, Reef Ball Foundation Designed Artificial Reefs, http://web.archive.org/web/20190105203541/http://www.reefball.org/ (last visited May 17, 2019), archive of Jan. 5, 2019.

Alex Goad, Mars Alex Goad (2014), http://web.archive.org/web/20140817210833/http://alex-goad.com/mars/ (last visited May 17, 2019).

Alex Goad, Modular artificial reef structure—Everyday Futures—Australia in the age of humans Everyday Futures (2018), http://web.archive.org/web/20180401055052/https://everydayfutures.com.au/project/modular-artificial-reef-structure/ (last visited May 17, 2019), archive of Apr. 1, 2018.

Reefmaker Artificial Reefs & Marine Ecosystems, web.archive.org/20181120160611/http://reefmaker.com, archive of Nov. 20, 2018.

Biorock Technology, web.archive.org/20181204221039/http://www.biorock.org/, archive of Dec. 4, 2018.

Biorock Technology, Method, web.archive.org/20181007030146/http://www.biorock.org/content/method, archive of Oct. 7, 2018.

\* cited by examiner

Fig. 10A
1 Mushroom Forest Assemblage
(Simple grouping for A, B or C sizes)
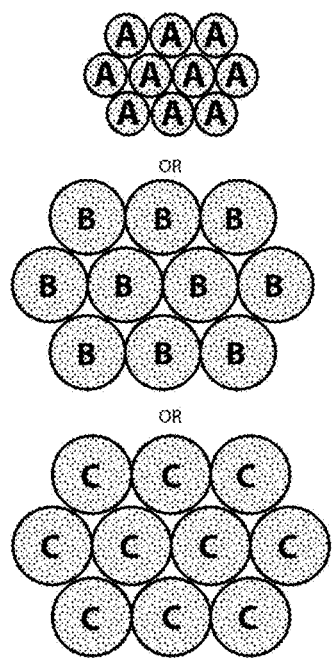
Fig. 10B
Mushroom Forest Assemblage
Grouping all sizes A, B and C
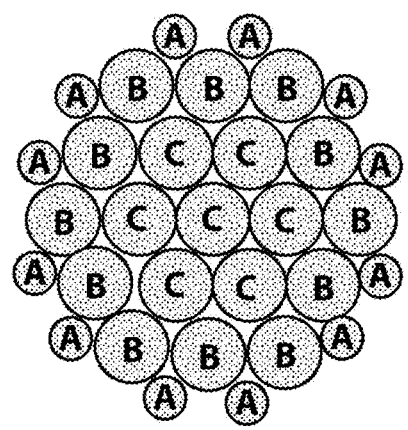
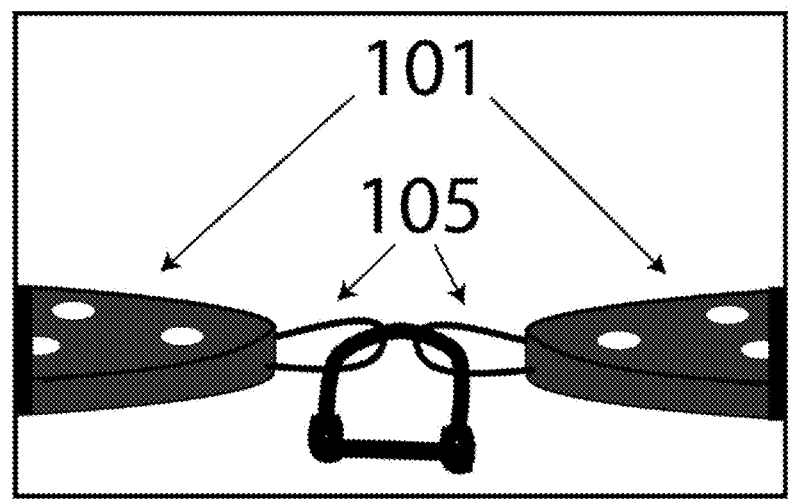
Fig. 11

MUSHROOM FOREST ARTIFICIAL REEF

FIELD

This invention relates to artificial reefs.

BACKGROUND

Loss of coral habitat for marine organisms has led to the use of artificial reefs. Artificial reefs may also contribute to the fishing and tourism industries. Many of the current designs suffer from one or more drawbacks. Some of these the sinking effect where the artificial reef (AR) sinks in the soft sediment, the burying effect where the ARs are covered by sediment, and the dragging effect where the strong currents drag the ARs from the initial deployment sit. Some ARs are large structures making the deployment in the sea bottom a complex operation. Some ARs do not assimilate bacterial fauna as desired. Some ARs do not separate the habitat for coral from the sediment on the soft bottom and/or do not have enough surface area close enough to light for coral growth. In addition, some ARs only have one type of habitat—only a habitat for coral, only a habitat for fish, etc.

Improved artificial reefs are needed.

SUMMARY

Embodiments of the present invention are directed to articles used as an artificial reef and/or used as a part of an artificial reef, methods of making the articles, methods of using the articles, and methods of forming artificial reefs. The articles include a top, at least one support member connected to the top, and optionally, a base. In some embodiments, the water permeability of a top of the article is greater (and in some embodiments, at least 10% greater) than the water permeability of the support, the water permeability of the optional base, or both.

BRIEF DESCRIPTION OF THE FIGURES

FIG. 8A illustrates specific measurements of the sub-article 2 (integrated base and column, such as that illustrated in FIG. 4) and FIG. 8B illustrates a top view of an embodiment of the present invention.

FIGS. 9A and 9B illustrate a three dimensional lateral and top view of the top with specific measurements for the top. FIG. 9C is a cross-sectional view of the top, showing the central hole used for assembling the top (sub-article 2) onto a support attached to or integrated with a base (sub-article 1, if one integral piece).

FIGS. 10A and 10B are non-limiting depictions from a top view of the possible assemblages of articles of the same size (FIG. 10A) or a combination of different sizes (FIG. 10B), such as but not limited to, the sizes illustrated in FIGS. 6A, 6B and 6C.

FIG. 11 a non-limiting depictions from a lateral view of the anchor points that may be used to connect the articles of the present invention.

DISCUSSION

Figure 1:
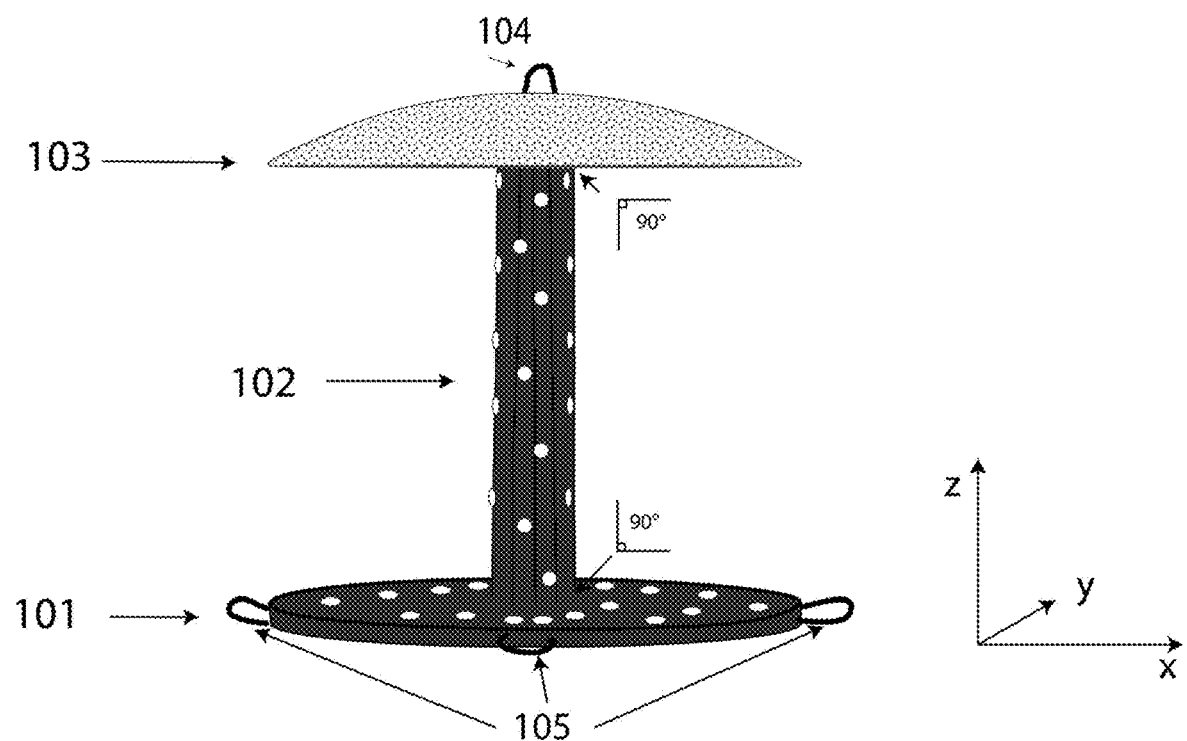
FIG. 1 is a non-limiting embodiment of an article of the present invention.

The phrase "as used herein" encompasses all of the specification, the abstract, the drawings (figures), and the claims.

Use of the singular herein includes the plural and vice versa unless expressly stated to be otherwise. That is, "a" (or "an") and "the" refer to one or more of whatever the word modifies. For example, "an article" may refer to one article, two articles, etc. Likewise, "the article" may refer to one, two or more articles and "the mineral" may mean one mineral or a plurality of minerals. By the same token, words such as, without limitation, "articles" and "minerals" would refer to one article or mineral as well as to a plurality of articles or minerals unless it is expressly stated or obvious from the context that such is not intended.

As used herein, the use of "preferred," "preferably," and "more preferred," and the like to modify an aspect of the invention refers to preferences as they existed at the time of filing of the patent application.

As used herein, "optional" means that the element modified by the term may or may not be present.

As used herein, the phrases "any combination of" and "a combination of" followed by a list joined by the conjunction "and," means any combination of two or more members of the group where the group members are the members of the list joined by the conjunction "and." As a non-limiting example, "any combination of A, B, C, and D" encompasses the following combinations: A and B; A and C; A and D; B and C; B and D; C and D; A, B, and C; A, B, and D; A, C, and D; B, C, and D; A, B, C, and D. Similarly, the phrase "A, B, C, D, or any combination thereof" encompasses an individual member (A, B, C, D) or any combination of A, B, C, and D, as outlined above. The phrase "A, B, C, D, or a combination thereof" encompasses an individual member (A, B, C, D) or any combination of A, B, C, and D, as outlined above. Similarly, the phrase "X is selected from the group consisting of A, B, C, D, and combinations thereof" (or a variant such as "X is selected from the group consisting of A, B, C, D, and all combinations thereof") encompasses X being an individual member of the group (A, B, C, D) or any combination of the A, B, C, and D, as outlined above. Although already encompassed by the description of singular and plural above, the terms "an individual member" and A will each be explicitly defined to encompass one or more members of A, if A is a genus, in the description above. Likewise, if B is a genus, "an individual member" and B each encompass one or more members of B in the above description, etc. As a non-limiting example, "halogen, OH, NH, CH$_3$, H, or any combination thereof" encompasses, but is not limited to encompassing, the following: I; Cl; NH; OH; Cl and F; Cl and OH; I, NH, H, and CH$_3$; I, Cl, and Br; I, F, and NH.

As used herein, the phrase "and/or" means a combination or an individual member. As a non-limiting example, "X is A, B, and/or C" encompasses the following possibilities: X is A; X is B; X is C; X is any combination of A, B, and C (A and B; A and C; B and C; A, B, and C). Although already encompassed by the description of singular and plural discussed above, it will explicitly be stated that if A is a genus, "an individual member" and A each encompass one or more members of A. Thus, as applied to the above non-limiting example, "X is A, B, and/or C" encompasses X is one or members of A; X is B; X is C; X is any combination of A, B, and C (B and one or more members of A; C and one or more members of A; B and C; B, C, and one or more members of A). In a likewise manner, "one or members of B" would apply if B were a genus, and the same for C, if C were a genus, etc.

As used herein, words of approximation such as, without limitation, "about," "substantially," "essentially," and "approximately" mean that the word or phrase modified by the term need not be exactly that which is written but may vary from that written description to some extent. The extent to which the description may vary will depend on how great a change can be instituted and have one of ordinary skill in the art recognize the modified version as still having the properties, characteristics and capabilities of the modified word or phrase. In general, but with the preceding discussion in mind, a numerical value herein that is modified by a word of approximation may vary from the stated value by ±10%, unless expressly stated otherwise.

As used herein, any ranges presented are inclusive of the end-points. For example, "a temperature between 10° C. and 30° C." and "a temperature from 10° C. to 30° C." include 10° C. and 30° C., as well as any temperature in between.

As used herein, a range may be expressed as from "about" one particular value and/or to "about" another particular value. When such a range is expressed, another embodiment is included, the embodiment being from one particular value and/or to the other particular value. Similarly, when values are expressed as approximations by use of the antecedent "about," it will be understood that the particular value forms another embodiment. As a non-limiting example, if "from about 1 to about 4" is disclosed, another embodiment is "from 1 to 4," even if not expressly disclosed. Likewise, if one embodiment disclosed is a temperature of "about 30° C.," then another embodiment is "30° C.," even if not expressly disclosed.

As used herein, "at least one of X" or "one or more X" includes the only X if there is only one X, and may include all X, only one X, or an intermediate number of X, to the extent possible, if there are two or more X. As a non-limiting example, if there is only one article, "at least one article" and "one or more articles" would refer to the one article. However, if there are four articles, "at least one article" encompasses one, two, three, or all four articles. Similarly, if there are four articles, "one or more articles" encompasses one, two, three, or all four articles.

As used herein, a "polymer" refers to a molecule comprised of, actually or conceptually, repeating "constitutional units." The constitutional units derive from the reaction of monomers. As a non-limiting example, ethylene (CH$_2$=CH$_2$) is a monomer that can be polymerized to form polyethylene, CH$_3$CH$_2$(CH$_2$CH$_2$)$_n$CH$_2$CH$_3$ (where n is an integer), wherein the constitutional unit is —CH$_2$CH$_2$—, ethylene having lost the double bond as the result of the polymerization reaction. The constitutional units themselves can be the product of the reactions of other compounds. A polymer may be derived from the polymerization of several different types of monomers and/or may be formed of several different types of constitutional units. Such polymers are referred to as "copolymers." For determination of mol %, the "constitutional unit" will be the smallest repeating unit (for example, it is "—CH$_2$—" for polyethylene). Those skilled in the art, given a particular polymer, will readily recognize the constitutional units of that polymer and will equally readily recognize the structure of the monomer from which the constitutional units derive.

As used herein, the term polymer refers to a molecule comprising more than 20 constitutional units.

A polymer may be straight or branched chain, or it may be star-like or dendritic. One polymer may be attached (grafted) onto another. Polymers may have a random disposition of constitutional units along the chain, the constitutional units may be present as discrete blocks, or constitutional units may be so disposed as to form gradients of concentration along the polymer chain. In other words, the polymers used in this invention may be regular alternating polymers, random alternating polymers, regular block polymers, random block polymers or purely random polymers unless expressly noted otherwise. Polymers may be cross-linked to form a network.

As used herein, a molecule that has a chain length of 20 or fewer constitutional units is referred to as an "oligomer."

As used herein, "wt %" is percent (%) by weight.

As used herein, two items are "connected" when they are attached to each other directly, or indirectly, through another item, such as, but not limited to, a bracket, and/or an adhesive layer, or the like. The attachment can be a mechanical attachment. The connection can be permanent or releasable.

As used herein, the term "floor" is used to refer to a surface on which an article is set whether the floor of a room, the ground, or the bottom of a body of water, such as, but not limited to, the sea floor. The surface need not be perfectly planar.

As used herein, a "hole" is an opening or a channel in a material created by any one or more of a combination of etching, laser machining, mechanical machining, drilling, and conventional processes known by persons of ordinary skill in the art. In some embodiments, a "hole" is formed in casting or molding a part. The location of holes may be predetermined.

As used herein, a "pore" is an opening or channel in a material that naturally results from the properties of the material and/or the manner of forming the material. The location of pores may not be pre-determined.

Embodiments of the present invention are directed to articles used as an artificial reef or used as a part of an artificial reef, methods of making the articles, methods of using the articles, and methods of forming artificial reefs.

The article shown in FIG. 1 is an exemplary and non-limiting embodiment of an article of the present invention.

Figure 2:
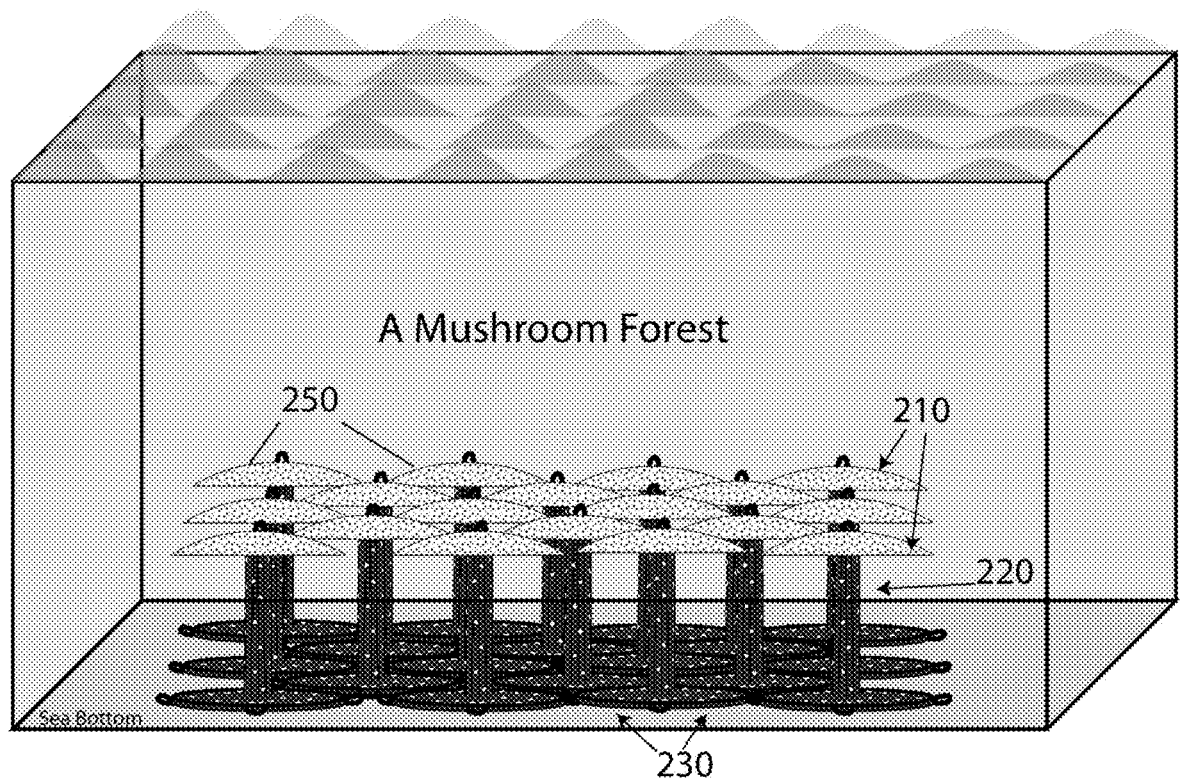
FIG. 2 is a non-limiting embodiment of an artificial reef of the present invention.

The article shown in FIG. 1, also referred to as a "unit," has a base (101), a support column (102) (also referred to as a support member), and a top (103). The overall shape can be described as a "mushroom" attached to a short cylindrically shaped base. Alternatively, the overall shape can be described as a bobbin or spool with one side being a dome or rounded shape (such as, but not limited to, a section of a sphere cut by a plane perpendicular to the axis of the sphere) rather than a disk, or very short cylinder shape. The exemplary embodiment of FIG. 1 includes a base, with a first surface intended for contact with the sediment at the bottom, that allows for the distribution of the weight over a surface area greater than the average cross-section of the support column, a support column designed to reduce hydrodynamic drag, the support column connected to a second surface of the base at one end of the column, and a top with a substantial surface area to provide habitat for coral and other organisms, the top connected to the other end of the support column. The exemplary embodiment shown in FIG. 1 includes a link (104) at the top that may be used for deployment (a "deployment link"), which is shown as a U shape. The exemplary embodiment shown in FIG. 1 also includes four "anchor points" (105) for attachment to other units. FIG. 2 is an exemplary and non-limiting embodiment of an artificial reef formed by connecting a number of units (250) of the exemplary embodiment depicted in FIG. 1. The non-limiting embodiment of a coral reef illustrated in FIG. 2 provides a coral growth habitat (210) that is a large surface area close to incident light that allows for coral growth, a fish habitat (220) that is an area of vertical columns that provides a habitat for some fish species but is not easily moved because the currents can easily flow through the vertical columns, and a large connected base that distributes the weight to limit sinking, that is an interface habitat (230). Embodiments of the present invention may include one or more of these features. The artificial reef of FIG. 2 is analogous to a forest of trees where each tree has a root system to anchor it, one or more trunks, and a canopy of tree limbs and leaves that shade out most incident light. In some embodiments of the present invention are articles that may be joined to form an artificial reef that mimics one in nature, and in particular, the natural coral reef shape of Abrolhos, in Brazil (South America), where the corals grow vertically forming columns that spread out laterally as it gets closer to surface, forming a mushroom shape of "calcium-carbonate" material.

Embodiments of the present invention encompass articles including, but not limited to including, a top with high porosity and permeability, the porosity of the top is at least 10%, and the water permeability of the top is not less than 1000 millidarcy (md); one or more support members, where each support member comprises a first end and a second end, and the first end of each support member is connected to the top; and optionally a base, and the second end of at least one support member being connected to base, if present. In some embodiments, the top is at least 5% less dense than the one or more support members and/or the top is at least 5% less dense than the base, if present. The articles may include, but are not limited to including, one or more deployment links to allow for deployment and/or one or more anchor points to allow for attachment to one or more other articles.

In some embodiments, the article comprises one or more deployment links. In some embodiments, the top of the article comprises one or more deployment links. In some embodiments, the top comprises a first surface and a second surface, the one or more support members being connected to the first surface of the top, and the second surface includes, but is not limited to including, the deployment link.

In some embodiments, the base is present. The base is the part of the article intended to be placed on the sediment of the body of water such as the seafloor, and a bottom surface (a first surface) of the base is intended to be set on the floor. The base may help in distributing the weight of the support and top over a larger surface area than if the support alone were used. In other words, the base is analogous to snowshoes in function. The base may include a first surface and a second surface. As illustrated in the exemplary embodiment of FIG. 1, the base is a very short cylinder with the height being much smaller than the diameter. However, the base is not so limited and the base may be of any shape and/or size. In some embodiments, the base is of the shape of a square, a rectangle, a circle, an oval, or a polygon. In some embodiments, the base is irregularly shaped. In some embodiments, the base includes, but is not limited to including, two surfaces that are parallel with each other or approximately parallel with each other (within 20° of parallel). In some embodiments, the base includes, but is not limited to including, two surfaces that are parallel with each other or within 10° of parallel with each other. In some embodiments, the base is a truncated cone and/or pyramid with a small angle compared to the floor (about 25° or lower, and in some embodiments, about 15° or lower). In preferred embodiments, the base is or includes, but is not limited to including, a plate or disk shaped object including, but not limited to including, two surfaces that are parallel with each other or approximately parallel with each other (within 10° of parallel) and are higher surface area than the remaining surfaces, and/or the base is or includes, but is not limited to including, a truncated pyramid or cone with a shallow angle (3 to 15°) with the bottom of the pyramid or cone a plane (the bottom being the surface resting on the floor). In some embodiments, the height of the base is in the range of 0.07 to 0.15 meters, and the length of a side, of the diameter, and/or the equivalent diameter, that is the diameter of a circle of the same surface area, is in the range of 0.5 to 3 meters.

In some embodiments, the third dimension (z axis as illustrated in FIG. 1) of the base of the article is not more than 25% of the average of dimensions in the other axes (x and y axes) and/or equivalent diameter of the base. In some embodiments, the third dimension (z axis as illustrated in FIG. 1) of the base of the article is not more than 20% of the average of dimension in the other axes (x and y axes) and/or equivalent diameter of the base. In some embodiments, the third dimension (z axis as illustrated in FIG. 1) of the base of the article is not more than 18% of the average of dimension in the other axes (x and y axes) and/or equivalent diameter of the base. In some embodiments, the third dimension (z axis as illustrated in FIG. 1) of the base is not more than 15% of the average of dimension in the other axes (x and y axes) and/or equivalent diameter of the base. In some embodiments, the third dimension (z axis as illustrated in FIG. 1) of the base of the article is not more than 12% of the average of dimension in the other axes (x and y axes) and/or equivalent diameter of the base of the article. In some embodiments, the third dimension (z axis as illustrated in FIG. 1) of the base of the article is not more than 10% of the average of dimension in the other axes (x and y axes) and/or equivalent diameter of the base of the article. In some embodiments, the third dimension (z axis as illustrated in FIG. 1) of the base of the article is not more than 8% of the average of dimension in the other axes (x and y axes) and/or equivalent diameter of the base of the article. In some embodiments, the third dimension (z axis as illustrated in FIG. 1) of the base of the article is not more than 5% of the average of dimension in the other axes (x and y axes) and/or equivalent diameter of the base of the article. In some embodiments, the third dimension (z axis as illustrated in FIG. 1) of the base of the article is not more than 2.5% of the average of dimension in the other axes (x and y axes) and/or equivalent diameter of the base of the article. In some embodiments, the third dimension (z axis as illustrated in FIG. 1) of the base of the article is not less than 0.01% of the average of dimension in the other axes (x and y axes) and/or equivalent diameter of the base of the article. As used herein, the "equivalent diameter" of the base of the article is the diameter of a circle having the same surface area as the first surface of the base of the article, that is the surface that would be set on the floor and different from the surface to which a support member is connected (typically, the top surface, but possibly a side surface). The base of the articles may be multiple pieces that may or may not be directly connected to each other. If the base is multiple pieces, the "equivalent diameter" refers to the diameter of a circle of the same area as the sum of the surface areas of the pieces of the base of the article, where the surface area of each piece is the surface of the piece of the base that would be set on the floor.

Figure 3:
FIG. 3 is a non-limiting depiction of example through holes.

In some embodiments, the base includes, but is not limited to including, one or more through holes. In some embodiments, the through holes are in pre-determined positions according to the molds used to form the base from precast concrete. In some embodiments, the exact position and shape of the holes in the base is variable based upon the type of precast-mold and the type of manufacturing method used. In some embodiments, a unit comprises a base comprising multiple pieces and all pieces of the base include, but are not limited to including, one or more through holes. In some embodiments, a unit comprises a base comprising multiple pieces and at least one of the pieces of the base includes, but is not limited to including, one or more through holes. A through hole is a hole extending from one surface of a solid object to another surface of, and/or another part of the same surface, of a solid object. A through hole allows fluid to pass in one end and out the other end. In the exemplary embodiment depicted in FIG. 1, the through holes are shown as circular, or nearly circular, openings. However, in the embodiments of the present invention the cross-section of through holes is not limited to being circular in shape and may be any shape. The through holes may be of uniform cross-sectional area (or essentially uniform cross-sectional area, that is the smallest cross-section is not less than 90% of the largest cross-sectional area), the cross-section may vary, or the through holes may be a combination of through holes of uniform and/or essentially uniform cross-sectional area, and through holes of variable cross-sectional area. The through holes may be straight, curved, and/or irregularly shaped and through holes of any combination of these may be present. As a non-limiting example, the through hole may extend from one surface directly to the opposite surface in a straight line with a uniform cross-section analogous to a tube. FIG. 3 shows some exemplary and non-limiting through holes. As shown in FIG. 3, the intersection of the through hole and the surface is not right angle, and the angle of intersection may vary. In some embodiments, the through hole opening at the surface is circular and of a diameter in the range of 5 to 10 cm. In some embodiments, the through hole opening at the surface has an equivalent diameter (the diameter of the circle of the same cross-sectional area) in the range of 5 to 10 cm.

In some embodiments, 10% to 50% of the surface of the base (or at least one piece of the base if the base is multiple pieces) is through holes. In some embodiments, 10% to 50% of the surface of the base (or at least one piece of the base if the base is multiple pieces) is through holes. In some embodiments, 10% to 25% of the surface of the base (or at least one piece of the base if the base is multiple pieces) is through holes. In some embodiments, 15% to 35% of the surface of the base (or at least one piece of the base if the base is multiple pieces) is through holes. In some embodiments, 10% to 20% of the surface of the base (or at least one piece of the base if the base is multiple pieces) is through holes. If the through hole is formed by a drill and the hole is drilled at an angle other than 90 degrees, the opening may have an area larger than the average cross-sectional area of the through hole. In some embodiments, the through holes do not intersect with each other. In some embodiments, fewer than 5% of the through holes intersect with another through hole. In determining the percent of the base member surface area that is through holes, the total surface area of the base member excludes surface area covered by and/or connected to the support member or support members. As a non-limiting example, the area of the base underneath the support column in the exemplary embodiment shown in FIG. 1 is not included in the surface area of the base.

The through holes creates open space that is porosity, in the base. The term porosity will be used even though the through holes are at predetermined locations. As used herein, the term percent porosity refers to the void content over the total volume expressed as a percent. As a non-limiting example, for a base that is a square of 20 cm*20 cm*1 cm with a 2 cm*2 cm support column connected in the middle and the base member including 10 through holes of 0.5 cm diameter making right angles with the top and bottom surfaces, the surface area of the through holes is $10*2$ surfaces$*3.14*(0.5/2)^2=3.925$ cm$^2$ and the volume of the through holes is $10*3.14*(0.5/2)^2*1=1.9625$ cm$^3$ and the total surface area is $2*20*20+4*20*1-2*2=876$ cm$^2$ and the total volume is $20*20*1=400$ cm$^3$ where the "*" indicates times, that is multiply. Thus, for the non-limiting example of the previous sentence, the porosity due to through holes, is $100*(1.9625/400)=0.491\%$ and the surface area covered by through holes is $100*(3.925/876)=0.448\%$. If the material, excluding through holes, has a porosity other than 0%, the porosity would be higher.

In some embodiments, the base (or at least one piece of the base if the base is multiple pieces) has a porosity in the range of 10% to 55%. In some embodiments, the base (or at least one piece of the base if the base is multiple pieces) has a porosity in the range of 15% to 55%. In some embodiments, the base (or at least one piece of the base if the base is multiple pieces) has a porosity in the range of 20% to 55%. In some embodiments, the base (or at least one piece of the base if the base is multiple pieces) has a porosity in the range of 10% to 45%. In some embodiments, the base (or at least one piece of the base if the base is multiple pieces) has a porosity in the range of 10% to 35%. In some embodiments, the base (or at least one piece of the base if the base is multiple pieces) has a porosity in the range of 10% to 25%. In some embodiments, the base (or at least one piece of the base if the base is multiple pieces) has a porosity in the range of 15% to 30%. In some embodiments, the porosity refers to the total porosity, that is the porosity of the material from which the base is made and the porosity resulting from through holes. In some embodiments, the porosity refers to the through hole porosity, that is the porosity created by the through holes. It is understood that the porosity may be chosen such that the porous article has adequate strength.

The base may be made of any material used for construction of items intended for seawater submersion. In some embodiments, the base (or at least one piece of the base if the base is multiple pieces) is formed from one or more materials, at least one of the materials being a material typically used for artificial reefs. In some embodiments, the base (or at least one piece of the base if the base is multiple pieces) is formed from one or more materials, at least one of the materials being a concrete typically used for artificial reefs. In other words, the base (or at least one piece of the base if the base is multiple pieces) includes, but is not limited to including, concrete. In other words, the base (or at least one piece of the base if the base is multiple pieces) includes, but is not limited to including, concrete with a normal composition for hard subsea precast (pattern proportion of rock, sand and cement) with natural-micro-fibers reinforcement, steel reinforcement, or both natural-micro-fibers reinforcement, steel reinforcement, and cement with neutral PH and without hazard chemicals. Non-limiting examples of such cements include CP I/CP V ARI/CP II 32 E, and/or F. In some embodiments, the base (or at least one piece of the base if the base is multiple pieces) is formed from one or more materials, the materials being environmentally friendly (such as natural fibers and special cement, avoiding chemical additives typically that may be used in concrete, such as, but not limited to, antibiotic agents and agents added for pH control). In some embodiments, the base is free of antibiotic agents. In some embodiments, the base (or at least one piece of the base if the base is multiple pieces) is formed from one or more materials, at least one of the materials being an environmental friendly cement. In preferred embodiments, the base (or at least one piece of the base if the base is multiple pieces) is formed from steel reinforced concrete and optionally one or more other materials. In some embodiments, the base includes one or more through holes, and the holes are pre-determined in the molds used for forming the base from precast concrete. In preferred embodiments, the base (or at least one piece of the base if the base is multiple pieces) is formed from steel reinforced concrete, natural fibers reinforcement, rocks and optionally one or more other natural materials where the concrete is of neutral pH and the concrete has high durability and resistance. The materials described herein may be used individually or in combination with other materials including, but not limited to, those described herein. In some embodiments, the material may be concrete with steel, natural fibers, rocks, or any combination thereof added, in addition to other additives.

In some embodiments, the base (or at least one piece of the base if the base is multiple pieces) is free of or substantially free of (less than 1 wt %) synthetic polymers. As used herein, a synthetic polymer refers to one that is created wholly in the laboratory while a semi-synthetic polymer refers to a naturally occurring polymer that has been chemically modified in the laboratory. In some embodiments, the base (or at least one piece of the base if the base is multiple pieces) is free of or includes less than 0.1 wt % synthetic polymers. In some embodiments, the base includes, but is not limited to including, multiple pieces, and all pieces are free of, or includes less than 0.1 wt % synthetic polymers.

In some embodiments, the base (or at least one piece of the base if the base is multiple pieces) is free of or substantially free of (less than 1 wt %) magnetic particles. In some embodiments, the base (or at least one piece of the base if the base is multiple pieces) is free of or includes less than 0.1 wt % magnetic particles. In some embodiments, the base includes, but is not limited to including, multiple pieces, and all pieces are free of, or includes less than 0.1 wt % magnetic particles.

In some embodiments, the base includes, but is not limited to including, anchor points. An anchor point allows the article (unit) to be connected to one or more other articles (units) to form at least a part of an artificial reef. In some embodiments, a unit comprises a base comprising multiple pieces and all pieces of the base include, but are not limited to including, one or more through anchor points. In some embodiments, a unit comprises a base comprising multiple pieces and at least one of the pieces of the base includes, but is not limited to including, one or more anchor points. In preferred embodiments, the base includes one or more anchor points. The exemplary non-limiting embodiment shown in FIG. 1 includes four (4) anchor points distributed approximately equally around the circular base/cylindrical shaped base, that is about 90 degrees apart. The anchor points depicted in the exemplary, but non-limiting, embodiment shown in FIG. 1 are U shaped protrusions from the side of the base. In some embodiments, the anchor points on at least one base member (and in some embodiments, if multiple base members are present, all base members) of the unit are protrusions from the base allowing for connection to the base of at least one other unit. In some embodiments, the anchor points are made of one or more materials where at least one of the one or more materials is a metal. In some embodiments, the protrusions are in the shape of a U. In some embodiments, the protrusions are in the shape of an "eye" (loop) like that of a hook and eye connector. The protrusions allow for a chain, rope, and/or a link of a chain, to be hooked through the U or loop shaped protrusions to connect the units. An example is shown in FIG. 11. In some embodiments, an anchor point is a large through hole near the edge of the base that allows for a chain, rope, and/or a link of a chain, to be hooked through the through hole and connected to another unit. A combination of different types of anchor points may be used. Different pieces of the base may include different types of anchor points, and/or multiple different types of anchor points may be used on the base (or at least one piece of the base if the base is multiple pieces).

Embodiments of the present invention encompass articles including, but not limited to including, one or more support members, wherein each support member is connected to the top at one end of the support member and the other end of the support member may be connected to the base, if present, or may not be connected to the base. In some embodiments, a support member not connected to the base contacts the floor when the article is used as intended. The support member, or support members, optionally in combination with the base, if present, support or at least partially support the top and provide some separation of the top from the sediment at the bottom of the body of water, such as, but not limited to, the sea bed. A member attached to the top that does not also attach to the base or does not rest on the floor in any configuration in which the article is used as intended, is not a support member. In some embodiments, the support member, or support members, optionally in combination with the base, if present, support the top at a position in the body of water to allow the top to receive incident light. In some embodiments, the position of the top allows the top to receive sufficient incident light to support coral growth. In some embodiments, the support member is designed to limit hydrodynamic drag from flowing water when the article is placed under water. In some embodiments, the water flows in a direction parallel and/or approximately parallel (within ±25°) with the base, if present, and/or the top. In some embodiments, the water flows in a direction parallel and/or approximately parallel (within ±25°) with the floor. As shown in the exemplary, but not limiting, embodiment of FIG. 1, the support member is a column, but it is not a perfectly cylindrically shaped column. In some embodiments, the support member is a generally elongate member. However, embodiments of the present invention are not limited to such support members. The shape of the cross-section of the support member is not limited. The cross-section of the support member may be a circle, a triangle, a square, a rectangle, or a polygon of any number of sides (equal to or greater than three, obviously). The cross-section may be of the shape of two or more curves that meet at two or more points on the circumference (a "half-moon" as a non-limiting example). The support member may be L-shaped or U-shaped in cross-section. The cross-section of the support member may be irregularly shaped or of a free-form shape. The cross-section of the support member may be a uniform size from the base to the top or it may be non-uniform. The cross-section shape of the support member may change over the height of the support member. The support member may have one or more protrusions or arms. As used herein, a "protrusion" or "arm" differs from undulations or variations in cross-section over the support member height. In some embodiments, a protrusion or arm of the support member is of a length of at least 10% of the equivalent diameter of the cross-section of the support member at the point where the protrusion or arm is attached to the support member, but not including the protrusion or arm in the cross-sectional area. In some embodiments, an arm extends from one support member and connects to another support member. In preferred embodiments, the support member is free of protrusions or arms. In some embodiments, protrusions or arms are present, and at least 70% of the height of the support member is free of bar arms or protrusions. In some embodiments, the support is a tube. In some embodiments, the support member is an elongate member including a bore hole extended from the bottom (connection to the base if present) to the connection with the top. In preferred embodiments, the shape of the cross-section is the same over the height of the support member. In some embodiments, the shape of the cross-section is the same over at least over at least 85% of the height of the support member. In preferred embodiments, the support member is tapered with a larger cross-sectional area at the end that connects with the base (if present) and a smaller cross-sectional area at the end that connects with the top. In some embodiments, the support member is tapered and the ratio of the cross-sectional area of the end connecting with the top to the other end being in the range of about 0.15 to about 0.95. In some embodiments, the support member is tapered and the ratio of the cross-sectional area of the end connecting with the top to the other end being in the range of about 0.10 to about 0.75. In some embodiments, the support member is tapered and the ratio of the cross-sectional area of the end connecting with the top to the other end being in the range of about 0.70 to about 0.90. If there are multiple support members, the support members may not all be the same. The support members may differ shape and/or size.

In some embodiments, the third dimension (z axis as illustrated in FIG. 1) of at least one support member is at least 2 times the diameter of a circle of the same cross-section as the area of the cross-section of the support member at half-height. In some embodiments, the third dimension (z axis as illustrated in FIG. 1) of at least one support member is at least 2.5 times the diameter of a circle of the same cross-section as the area of the cross-section of the support member at half-height. In some embodiments, the third dimension (z axis as illustrated in FIG. 1) of at least one support member is at least 3 times the diameter of a circle of the same cross-sectional area as the area of the cross-section of the support member at half-height, and/or the average cross-sectional area of the support. In some embodiments, the third dimension (z-axis as illustrated in FIG. 1) of at least one support member is at least 3.5 times the diameter of a circle of the same cross-sectional area as the area of the cross-section of the support member at half-height, and/or the average cross-sectional area of the support. In some embodiments, the third dimension (z-axis as illustrated in FIG. 1) of at least one support member is at least 4 times the diameter of a circle of the same cross-sectional area as the area of the cross-section of the support member at half-height, and/or the average cross-sectional area of the support. In some embodiments, the third dimension (z-axis as illustrated in FIG. 1) of at least one support member is at least 5 times the diameter of a circle of the same cross-sectional area as the area of the cross-section of the support member at half-height, and/or the average cross-sectional area of the support. In some embodiments, the third dimension (z-axis as illustrated in FIG. 1) of at least one support member is at least 6 times the diameter of a circle of the same cross-sectional area as the area of the cross-section of the support member at half-height, and/or the average cross-sectional area of the support. In some embodiments, the third dimension (z-axis as illustrated in FIG. 1) of at least one support member is at least 8 times the diameter of a circle of the same cross-sectional area as the area of the cross-section of the support member at half-height, and/or the average cross-sectional area of the support. In some embodiments, a support member is formed of multiple support member pieces stacked and/or connected to form the support member.

In some embodiments, at least one of the one or more support members includes, but is not limited to including, one or more through holes. The through holes may have any one or more of the attributes of the through holes described herein with respect to the base member. The through holes may be in one or more of the support members, but not all support members, or may be in all support members.

In some embodiments, 10% to 50% of the surface of at least one support member is through holes. In some embodiments, 10% to 50% of the surface of at least one support member is through holes. In some embodiments, 10% to 25% of the surface of at least one support member is through holes. In some embodiments, 15% to 35% of the surface of at least one support member is through holes. In some embodiments, 10% to 20% of the surface of at least one support member is through holes. In some embodiments, the through holes do not intersect with each other. In some embodiments, less than 5% of the through holes intersect with another through hole. For the percent of the support member surface area that is through holes, the total surface area of the support member excludes surface area covered by and/or connected to the base and/or top, and/or contacting the floor. As a non-limiting example, the area of the support member sitting on the base member and contacting the top in the exemplary embodiment shown in FIG. 1 is not included in the surface area of the support member when calculating the percentage coverage by through holes.

The through holes create porosity in the support member(s). As used herein, the term percent porosity refers to the void content over the total volume expressed as a percent. As a non-limiting example, for a support that is a square of 8 cm*8 cm*50 cm and the support member including 10 through holes of 0.5 cm diameter making right angles with the two of the four side surfaces, the surface area of the through holes is $10*2 \text{ surfaces}*3.14*(0.5/2)^2=3.925 \text{ cm}^2$ and the volume of the through holes is $10*3.14*(0.5/2)^2*1=1.9625 \text{ cm}^3$ and the total surface area is $4*8*50=1600 \text{ cm}^2$ and the total volume is $8*8*50=3200 \text{ cm}^3$ where the "*" indicates times or multiply. Thus, for the non-limiting example of the previous sentence, the porosity is $100*(1.9625/1600)=0.246\%$ and the surface area covered by through holes is $100*(3.925/3200)=0.491\%$. These calculations assume that the porosity of the base material is 0%, and if not 0%, the actual porosity would be higher taking into account the pores in the material in addition to through holes.

In some embodiments, at least one support member has a porosity in the range of 5% to 55%. In some embodiments, at least one support member has a porosity in the range of 15% to 55%. In some embodiments, at least one support member has a porosity in the range of 20% to 55%. In some embodiments, at least one support member has a porosity in the range of 5% to 45%. In some embodiments, at least one support member has a porosity in the range of 10% to 35%. In some embodiments, at least one support member has a porosity in the range of 10% to 25%. In some embodiments, at least one support member has a porosity in the range of 15% to 30%. In some embodiments, at least one support member has a porosity in the range of 5% to 12%. It is understood that the porosity may be chosen such that the porous article has adequate strength to support, or partially support, the top. In some embodiments, the porosity refers to the total porosity, that is the porosity of the material from which the at least one support member is made and the porosity resulting from through holes. In some embodiments, with respect to the at least one support member, the porosity refers to the through hole porosity, that is the porosity created by the through holes.

The support member(s) may be made of the same materials used to form the base. The base and the support member(s) may be made from the same materials or different materials. The base and the support members may have some materials of construction in common but the materials of construction may not be identical. As a non-limiting example, both the base and the support member(s) may be formed from concrete but the concrete formulation may be different. In some embodiments, the base and the support member are both formed of reinforced concrete and the concrete is the same. In some embodiments, the base and the support member are both formed of reinforced concrete and both the reinforcement material and the concrete are the same although the pattern of the reinforcement material may be different. In some embodiments, the base and the support member are both formed of reinforced concrete and the concrete is the same but the reinforcement material used is different. In some embodiments, the reinforcement material is rebar. In some embodiments, the reinforcement material is a wire mesh where the wire comprises one or more metals. It is understood that the base and the support member may be multiple pieces or a single piece, and the pieces of the base and support may be of the same or different materials.

In some embodiments, the support member, or at least one support member if multiple support members are present, is free of or substantially free of (less than 1 wt %) synthetic polymers. In some embodiments, multiple support members are present and all support members are free of or substantially free of (less than 1 wt %) synthetic polymers. In some embodiments, the support member, or at least one support member if multiple support members are present, is free of, or includes not more than 0.1 wt %, synthetic polymers. In some embodiments, multiple support members are present and all support members are free of, or include not more than 0.1 wt %, synthetic polymers.

In some embodiments, the surface of the base and/or the surface of at least one support member is rough, that is having a surface roughness. Surface roughness is the deviation of a surface from a mathematically perfect plane. In some embodiments, the surface roughness is formed by using small elevations and depressions (around about 1 to 3 centimeters (cm)) in the precast molds (for precast concrete), and these elevations and depressions create a rough surface in the base and/or support member of the article of the present invention. It is understood that the base and the support member may be multiple pieces or a single piece, and one or more pieces of the base and one or more pieces of the support member may include a rough surface.

In some embodiments, the support member, or at least one support member if multiple support members are present, is free of or substantially free of (less than 1 wt %) magnetic particles. In some embodiments, multiple support members are present and all support members are free of or substantially free of (less than 1 wt %) magnetic particles. In some embodiments, the support member, or at least one support member if multiple support members are present, is free of, or includes not more than 0.1 wt %, magnetic particles. In some embodiments, multiple support members are present and all support members are free of, or include not more than 0.1 wt %, magnetic particles. Embodiments of the present invention encompass articles including, but not limited to including: a top, the water permeability of the top being at least 1000 millidarcy; one or more support members, where each support member comprises a first end and a second end, and the first end of each support member is connected to the top; and optionally, a base, and the second end of at least one support member being connected to the base, if present. In some embodiments, the water permeability of the top is between 1000 to 5000 millidarcy, and the top is enriched in calcium carbonate, so that the water influx and outflux will provide a bacterial enrichment in the top of the article of the present invention that provides a probiotic characteristic to the article. In some embodiments, the top has a water permeability between 1000 to 5000 millidarcy, and calcium carbonate enrichment, and thus, it is similar to the ideal local bacterial composition that occurs in natural substrate for benthic species settlement and establishment. In some embodiments, the water permeability of the top, that is at least 1000 millidarcy, is more than that of standard concrete, where the permeability of standard concrete is similar to that of a hard rock structure, that is between 100-500 millidarcy. In some embodiments, the water permeability of the top is in the range of 1000 to 5000 millidarcy. In some embodiments, the water permeability of the top is in the range of 1500 to 5000 millidarcy. In some embodiments, the water permeability of the top is in the range of 2000 to 5000 millidarcy. In some embodiments, the water permeability of the top is in the range of 2500 to 5000 millidarcy. In some embodiments, the water permeability of the top is in the range of 1500 to 4000 millidarcy. In some embodiments, the water permeability of the top is in the range of 3000 to 5000 millidarcy. In some embodiments, the water permeability of the top is in the range of 4000 to 5000 millidarcy.

In some embodiments, the water permeability results from porosity of a top formed of one or more materials, at least one material being concrete, and the porosity of the top is at least 10%, and preferably, the porosity is in the range of 10% to 45%. In some embodiments, the porosity of the top includes pores that are true small pores in the entire structure of the top, and does not include any specifically formed holes. In some embodiments, the average diameter of the pores in the top is 1-7 mm. In some embodiments, the porosity of the top is at least partially the result of manufacturing with concrete and aeration of the concrete during formation of the top as a precast concrete part. In some embodiments, the porosity of the top is at least partially the result of using water soluble rocks (rocks that smelts underwater) in a concrete used in forming a pre-cast concrete top. In some embodiments, as a result of the porosity, the top of the article of the present invention is a lighter concrete with intense water permeability, but the top is also reinforced with natural fibers that provide probiotic concrete resistance and toughness. As a comparison, many of the prior art artificial reefs are made from standard concrete that has a porosity in the range 5% or less than 5%, (the porosity cited here excludes any pre-formed holes). In some embodiments, the top of the article of the present invention provides a substrate that coral can grow on, and the surface area for coral growth is a combination of the porosity of the top and the size of the top. In some embodiments, the top includes a white concrete including, but not limited to including, natural fibers used for reinforcement, enriched with calcium carbonate, rocks, and/or natural shells to increase the durability; and with water soluble rocks added to the concrete and aeration of the concrete to increase the porosity.

Figure 9:
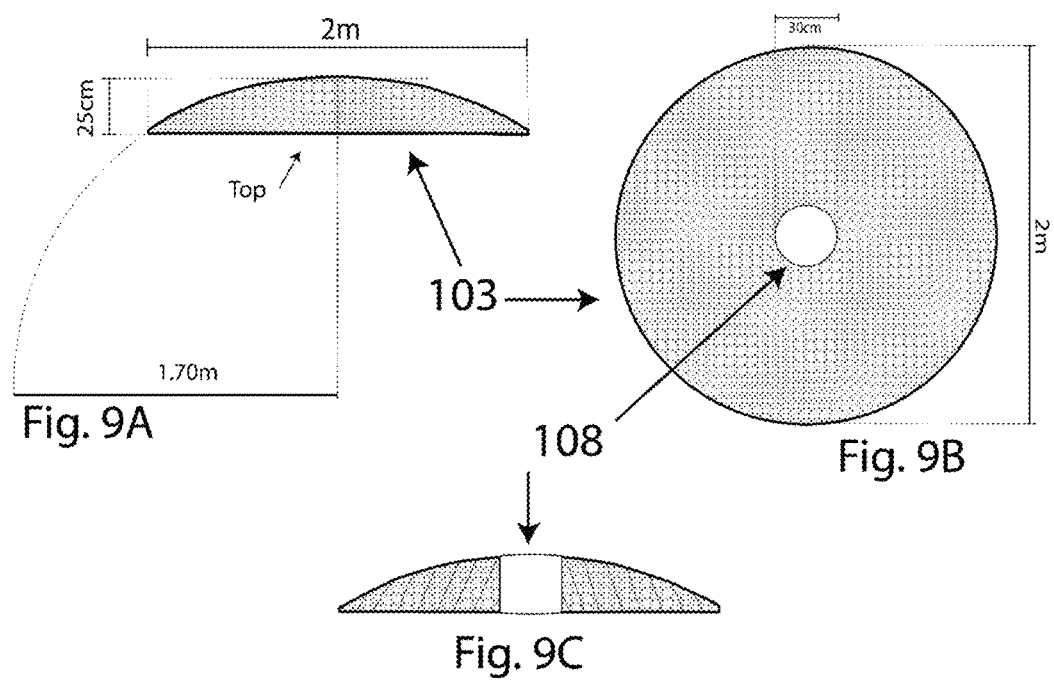
FIG. 9A-9C is an illustration of a sub-article of a non-limiting embodiment of an article of the present invention, a sub-article 2 (top) for an embodiment of an article that is 2 meters in height, such as, but not limited to, the embodiment illustrated in FIG. 6B.

As illustrated in the exemplary (and non-limiting) embodiment of FIG. 1, and also in FIG. 9, the top is a circular dome-shaped object with a height that is smaller than the diameter. However, the top is not so limited, and the top may be of any shape and/or size. In some embodiments, the top is of the shape of a square, a rectangle, a circle, an oval, or a polygon. In some embodiments, the top is irregularly shaped. In some embodiments, the top is a free form shape. In some embodiments, the top is a hemisphere or section of a sphere in shape (where a section of a sphere is the portion of a sphere cut by a plane perpendicular to the axis of the sphere, and a hemisphere is a section where the plane intersects the center of the sphere). In some embodiments, the top is a curved shape or domed shape that is not a true hemisphere, and is not a true section of a sphere in shape. In some embodiments, the top is a pyramid or a truncated pyramid, where the base of the pyramid may be any shape, including, but not limited to, a rectangle, a circle, an oval, a square, or a polygon. A truncated pyramid may be truncated by a plane dissecting the pyramid that is parallel to the base (preferred embodiments) or a plane that is not parallel to the base. In some embodiments, the top is a dome shaped article like an umbrella that is part of a hollow sphere. In some embodiments, the top is two or more pieces and each piece is connected to a support member and/or another top piece.

In some embodiments, the height of the top is in the range of 0.10 to 0.5 meters, and the length of a side, the diameter, and/or the equivalent diameter, that is the diameter of a circle of the same projected surface area as the top, is in the range of 0.5 to 5 meters. In some embodiments, the third dimension (z axis as illustrated in FIG. 1) of the top is not more than 40% of the average of dimension in the other axes (x and y axes) and/or equivalent diameter of the top. In some embodiments, the third dimension (z axis as illustrated in FIG. 1) of the top is not more than 35% of the average of dimension in the other axes (x and y axes) and/or equivalent diameter of the top. In some embodiments, the third dimension (z axis as illustrated in FIG. 1) of the top is not more than 30% of the average of dimension in the other axes (x and y axes) and/or equivalent diameter of the top. In some embodiments, the third dimension (z axis as illustrated in FIG. 1) of the top is not more than 25% of the average of dimension in the other axes (x and y axes) and/or equivalent diameter of the top. In some embodiments, the third dimension (z axis as illustrated in FIG. 1) of the top is not more than 20% of the average of dimension in the other axes (x and y axes) and/or equivalent diameter of the top. In some embodiments, the third dimension (z axis as illustrated in FIG. 1) of the top is not more than 15% of the average of dimension in the other axes (x and y axes) and/or equivalent diameter of the top. In some embodiments, the third dimension (z axis as illustrated in FIG. 1) of the top is not more than 12.5% of the average of dimension in the other axes (x and y axes) and/or equivalent diameter of the top. In some embodiments, the third dimension (z axis as illustrated in FIG. 1) of the top is not less than 0.05% of the average of dimension in the other axes (x and y axes) and/or equivalent diameter of the top. As used herein, the "equivalent diameter" of the top is the equivalent diameter of a circle having the same projected area as the top (if projected onto the floor and/or a plane parallel to the floor when set on the floor in the intended orientation). If the top is multiple pieces, the projected area is the area of all pieces of the top. With respect to the height of the top if the top is multiple pieces, the height is measured from the lowest piece to the highest piece in a line orthogonal to the floor on which the article is placed.

Embodiments of the present invention encompass articles including, but not limited to including: a top, the water permeability of the top being at least 1000 millidarcy; one or more support members, where each support member comprises a first end and a second end, and the first end of each support member is connected to the top; and the article optionally including, but not limited to including, a base, and the second end of at least one support member being connected to the base, if present; and in some embodiments, the projected area of the top is in the range of 70% to 130% of the floor contact area of the article. The projected area of the top is the two dimensional area as projected onto the floor and/or a plane parallel with the floor. A top that is a short cylinder of diameter X and a top that is a hemi-sphere shape of the same diameter X would have the same projected area although the three dimensional tops are different. As used herein, the term "floor contact area" of the article is the surface area of the article in contact with the floor (the floor, ground, floor of a building, etc.) when it rests on the floor (or ground) in the orientation intended and the top does not touch the floor. In some embodiments, the projected area of the top is in the range of 75% to 125% of the floor contact area of the article. In some embodiments, the projected area of the top is in the range of 80% to 120% of the floor contact area of the article. In some embodiments, the projected area of the top is in the range of 85% to 115% of the projected area of the floor contact area of the article. In some embodiments, the projected area of the top is in the range of 90% to 110% of the floor contact area of the article. For the projected area of the top as compared to the floor contact area of the article, the sum of the projected area of all pieces of the top as part of the unit is compared to the floor contact area that includes the floor contact area of all pieces of the base and the floor contact area of any support members in contact with the floor.

In some embodiments, the projected area of the top overlaps at least 80% of the floor contact area of the article when an article is placed on an approximately flat surface, such as but not limited to, a seabed, in its intended orientation. As shown in FIG. 6A-6C, if the base and the top are of the same diameter and the centers are aligned, the projected area of the top overlaps 100% of the floor contact area (or at least 95% if there are some small variations from perfect alignment), and in these cases the bottom surface of the base (assuming the top does not include any through holes). On the other hand, even if the top is the same shape and size (diameter) as the base, the projected area of the top may not entirely overlap the floor contact area if the center of the top and bases are not aligned along a line orthogonal to the projection plane. In some embodiments, the projected area of the top overlaps at least 85% of the floor contact area of the article when an article is placed on an approximately flat surface in the intended orientation. In some embodiments, the projected area of the top overlaps at least 90% of the floor contact area of the article when an article is placed on an approximately flat surface in the intended orientation. In some embodiments, the projected area of the top overlaps at least 95% of the floor contact area of the article when an article is placed on an approximately flat surface in the intended orientation. One of skill in the art will be able to determine the intended orientation of the articles based upon the disclosure herein. The overlap of the projected area allows for a large surface area at the height of the tops of the articles (analogous to the canopy formed by trees in a forest) without large areas of no habitat when the articles are joined together. If the projected area of the tops overlaps the floor contact area by 50% or less there may be "holes" in the "canopy" because the tops may not properly align and/or the tops do not span the area of the base.

In some embodiments, the average cross-sectional area of the support member or, if multiple support members, the sum of the average cross-sectional areas of the support members, is not more than 50% of the projected area of the top when projected on the floor, and/or a plane parallel with the floor. The support member has, or the support members have, a smaller cross-section area than the top to allow for movement of water past the support member or members while the top provides a large surface area for coral growth. In some embodiments, the average cross-sectional area of the support member or, if multiple support members, the sum of the average cross-sectional areas of the support members, is not more than 45% of the projected area of the top when projected on the floor, and/or a plane parallel with the floor. In some embodiments, the average cross-sectional area of the support member or, if multiple support members, the sum of the average cross-sectional areas of the support members, is not more than 40% of the projected area of the top when projected on the floor, and/or a plane parallel with the floor. In some embodiments, the average cross-sectional area of the support member or, if multiple support members, the sum of the average cross-sectional areas of the support members, is not more than 35% of the projected area of the top when projected on the floor, and/or a plane parallel with the floor. In some embodiments, the average cross-sectional area of the support member or, if multiple support members, the sum of the average cross-sectional areas of the support members, is not more than 30% of the projected area of the top when projected on the floor, and/or a plane parallel with the floor. In some embodiments, the average cross-sectional area of the support member or, if multiple support members, the sum of the average cross-sectional areas of the support members, is not more than 25% of the projected area of the top when projected on the floor, and/or a plane parallel with the floor. In some embodiments, the average cross-sectional area of the support member or, if multiple support members, the sum of the average cross-sectional areas of the support members, is not more than 20% of the projected area of the top when projected on the floor, and/or a plane parallel with the floor.

In some embodiments, the average cross-sectional area of the support member or, if multiple support members, the sum of the average cross-sectional areas of the support members, is not more than 75% of the floor contact area. In some embodiments, the average cross-sectional area of the support member or, if multiple support members, the sum of the average cross-sectional areas of the support members, is not more than 60% of the floor contact area. In some embodiments, the average cross-sectional area of the support member or, if multiple support members, the sum of the average cross-sectional areas of the support members, is not more than 50% of the floor contact area. The support member has, or the support members have, a smaller cross-section area than the top to allow for movement of water past the support member or members while the top provides a large surface area for coral growth. In some embodiments, the average cross-sectional area of the support member or, if multiple support members, the sum of the average cross-sectional areas of the support members, is not more than 45% of the floor contact area. In some embodiments, the average cross-sectional area of the support member or, if multiple support members, the sum of the average cross-sectional areas of the support members, is not more than 40% of the floor contact area. In some embodiments, the average cross-sectional area of the support member or, if multiple support members, the sum of the average cross-sectional areas of the support members, is not more than 35% of the floor contact area. In some embodiments, the average cross-sectional area of the support member or, if multiple support members, the sum of the average cross-sectional areas of the support members, is not more than 30% of the floor contact area. In some embodiments, the average cross-sectional area of the support member or, if multiple support members, the sum of the average cross-sectional areas of the support members, is not more than 25% of the floor contact area. In some embodiments, the average cross-sectional area of the support member or, if multiple support members, the sum of the average cross-sectional areas of the support members, is not more than 20% of the floor contact area.

The surface area for coral growth is a combination of the porosity of the top and the size of the top. In some embodiments, the porosity of the top (or at least one of the pieces of the top if there are multiple top pieces) is in the range of 10% to 45%. In some embodiments, the porosity of the top (or at least one of the pieces of the top if there are multiple top pieces) is in the range of 15% to 45%. In some embodiments, the porosity of the top (or at least one of the pieces of the top if there are multiple top pieces) is in the range of 20% to 45%. In some embodiments, the porosity of the top (or at least one of the pieces of the top if there are multiple top pieces) is in the range of 25% to 40%. In some embodiments, the porosity of the top (or at least one of the pieces of the top if there are multiple top pieces) is in the range of 20% to 30%. In some embodiments, the porosity of the top (or at least one of the pieces of the top if there are multiple top pieces) is in the range of 30% to 45%. In some embodiments, the porosity of the top (or at least one of the pieces of the top if there are multiple top pieces) is in the range of 35% to 45%. In some embodiments, the porosity of the top (or at least one of the pieces of the top if there are multiple top pieces) is in the range of 25% to 35%. In some embody-ments, the average pore size is in the range of 1-6 millimeters (mm). In some embodiments, the average pore size is in the range of 2-5 millimeters (mm). In some embodiments, the average pore size is in the range of 3-5 millimeters (mm). In some embodiments, the average pore size is in the range of 1-3 millimeters (mm). In some embodiments, the average pore size is in the range of 1-4 millimeters (mm). In some embodiments, the average pore size is in the range of 2-4 millimeters (mm). In some embodiments, the average pore size is in the range of 4-6 millimeters (mm). In some embodiments, the average pore size is in the range of 3-6 millimeters (mm). In some embodiments, the average pore size is in the range of 5-6 millimeters (mm).

The top may be made of any material used for construction items intended for seawater submersion. In preferred embodiments, the top is made of different materials than the support member(s). In preferred embodiments, the top is made of different materials than the base. A first item is made of a different material than a second item if the first item includes at least one material that is not present in the second item, and/or different proportion(s) of materials are present in the first item than the second item. Similar reasoning applies to different support members, different pieces of a support member, or different pieces of the base which may be the same or different materials.

In some embodiments, the top (or at least one piece of the top if multiple pieces) is formed of one or more materials, at least one material being a probiotic concrete. In some embodiments, a probiotic concrete is a concrete with a water permeability of at least 1000 millidarcy and not more than 10,000 millidarcy, and the concrete including, but not limited to including, one or more natural fibers, a calcium carbonate ($CaCO_3$) content of at least 50 wt % of the "extra material" (all material used in the concrete recipe for the precast concrete production excluding the cement and water percentage), water soluble rocks (exclusive of $CaCO_3$), or any combination thereof. In some embodiments, the top is formed of a probiotic concrete with a water permeability of in the range of 1000 to 5000 millidarcy. In some embodiments, a probiotic concrete and/or the top includes, but is not limited to including, at least 5 wt % natural fibers of the extra material, and not more than 40 wt % of natural fibers in the extra material (as used herein, the concrete is formed by mixing cement, water, and extra material, and thus the extra material refers to the material added to the concrete mixture that is not cement and that is not water). In some embodiments, a probiotic concrete and/or the top includes, but is not limited to including, 5 wt % to 20 wt % natural fibers. Examples of natural fibers include, but are not limited to, cotton, silk, hemp, flax, wood pulp, among other natural fibers for concrete reinforcements traded and used in the building market (fibers without chemicals). In some embodiments, a probiotic concrete includes, but is not limited to including, at least 5 wt % and not more than 30 wt % of water soluble rocks among the extra material. As used herein, a "water soluble rock" has a high solubility in water, and in seawater, from 2 to 400 mg/mL at around 25° C. (e.g. NaCl is ~360 mg/mL in pure water); depending on the concentration of the minerals. It is understood that "rock" in the term "water soluble rock" is used generically and includes minerals. Non-limiting examples include, but are not limited to, $CaCO_3$, NaCl, and combinations thereof. In some embodiments, a probiotic concrete includes, but is not limited to including, at least 5 wt % and not more than 30 wt % of water soluble rocks (excluding $CaCO_3$) among the extra material. In preferred embodiments, the sum of the percent by volume (vol %) of the water soluble rock(s) and if present, the percent by volume (vol %) of water soluble component(s) other than the water soluble rock(s), in the top and/or in the probiotic concrete, is at or above the percolation limit. In some embodiments, the sum of the vol % of water soluble component(s) other than the water soluble rock(s), and the vol % of the water soluble rocks (exclusive of $CaCO_3$) in the top and/or in the probiotic concrete, is at least 5 vol % and not more than 30 vol % of the extra material (excluding the concentration of cement and water). In some embodiments, the sum of the vol % of water soluble component(s) other than the water soluble rock(s), and the vol % of the water soluble rocks (exclusive of $CaCO_3$) in the top and/or in the probiotic concrete, is at least 5 vol % and not more than 30 vol % of the top (or at least one piece of the top if the top is multiple pieces). In some embodiments, a probiotic concrete and/or the top (or at least one piece of the top is multiple pieces), includes, but is not limited to including, at least 50 wt % of $CaCO_3$ and not more than 80 wt % $CaCO_3$ among the extra material (excluding the concentration of cement and water). It is understood that calcium carbonate may be added by adding $CaCO_3$ and/or adding a material with a high $CaCO_3$ content, including, but not limited to including, limestone, calcite, dolomite and/or mollusks shells. In some embodiments, the weight to weight ratio of the "extra material" to cement is in the range of 3 to 12. In some embodiments, the weight to weight ratio of the "extra material" to cement is in the range of 4 to 11. In some embodiments, the weight to weight ratio of the "extra material" to cement is in the range of 5 to 8. In some embodiments, the weight to weight ratio of the "extra material" to cement is in the range of 3 to 6. All components of the concrete disclosed herein may be used individually or in combination with other concrete components including, but not limited to including, those specifically described herein. In some embodiments, the porosity in the probiotic concrete and/or the top (or at least one piece of the top if multiple pieces) is a result of dissolution of the water soluble rocks and, if present, other water soluble materials in the probiotic concrete and/or the top (or at least one piece of the top if multiple pieces). In some embodiments, the porosity in the probiotic concrete and/or the top (or at least one piece of the top if multiple pieces) is a result of dissolution of the water soluble rocks and, if present, other water soluble materials in the probiotic concrete and/or the top (or at least one piece of the top if multiple pieces). In some embodiments, the porosity in the probiotic concrete and/or the top (or at least one piece of the top if multiple pieces) is a result of dissolution of the water soluble rocks and the aeration of the concrete within the precast mold. In some embodiments, the top includes, but is not limited to including, large voids and/or cavities with pores and/or openings fluidly connecting the void and/or cavity to the exterior. In some embodiments, the porosity in the probiotic concrete and/or the top (or at least one piece of the top if multiple pieces) is a result of aeration of the concrete within the precast mold. A void or cavity is not a pore and has an equivalent diameter, or average dimension, at least 5 times larger than the average pore size.

In some embodiments, a probiotic concrete and/or the top includes, but is not limited to including, natural fibers in the range of at least 3 wt % and not more than 30 wt %. In some embodiments, a probiotic concrete and/or the top includes, but is not limited to including, natural fibers in the range of at least 3 wt % and not more than 10 wt %. In some embodiments, a probiotic concrete and/or the top includes, but is not limited to including, natural fibers in the range of at least 3 wt % and not more than 15 wt %. In some embodiments, a probiotic concrete and/or the top includes, but is not limited to including, natural fibers in the range of at least 5 wt % and not more than 25 wt %. In some embodiments, a probiotic concrete and/or the top includes, but is not limited to including, natural fibers in the range of at least 12 wt % and not more than 30 wt %. In some embodiments, a probiotic concrete and/or the top includes, but is not limited to including, natural fibers in the range of at least 10 wt % and not more than 25 wt %.

In some embodiments, a probiotic concrete and/or the top includes, but is not limited to including, at least 3 wt % and not more than 25 wt % of water soluble rocks where the water soluble rocks include $CaCO_3$. In some embodiments, a probiotic concrete and/or the top includes, but is not limited to including, at least 5 wt % and not more than 20 wt % of water soluble rocks where the water soluble rocks include $CaCO_3$. In some embodiments, a probiotic concrete and/or the top includes, but is not limited to including, at least 3 wt % and not more than 10 wt % of water soluble rocks where the water soluble rocks include $CaCO_3$. In some embodiments, a probiotic concrete and/or the top includes, but is not limited to including, at least 8 wt % and not more than 25 wt % of water soluble rocks where the water soluble rocks include $CaCO_3$. In some embodiments, a probiotic concrete and/or the top includes, but is not limited to including, at least 5 wt % and not more than 30 wt % of water soluble rocks where the water soluble rocks include $CaCO_3$. In some embodiments, a probiotic concrete and/or the top includes, but is not limited to including, at least 5 wt % and not more than 30 wt % of water soluble rocks where the water soluble rocks include $CaCO_3$.

In some embodiments, a probiotic concrete and/or the top includes, but is not limited to including, at least 3 wt % and not more than 25 wt % of water soluble rocks where the water soluble rocks exclude $CaCO_3$. In some embodiments, a probiotic concrete and/or the top includes, but is not limited to including, at least 5 wt % and not more than 20 wt % of water soluble rocks where the water soluble rocks exclude $CaCO_3$. In some embodiments, a probiotic concrete and/or the top includes, but is not limited to including, at least 3 wt % and not more than 10 wt % of water soluble rocks where the water soluble rocks exclude $CaCO_3$. In some embodiments, a probiotic concrete and/or the top includes, but is not limited to including, at least 8 wt % and not more than 25 wt % of water soluble rocks where the water soluble rocks exclude $CaCO_3$. In some embodiments, a probiotic concrete and/or the top includes, but is not limited to including, at least 5 wt % and not more than 30 wt % of water soluble rocks where the water soluble rocks exclude $CaCO_3$. In some embodiments, a probiotic concrete and/or the top includes, but is not limited to including, at least 5 wt % and not more than 30 wt % of water soluble rocks where the water soluble rocks exclude $CaCO_3$.

In some embodiments, a probiotic concrete and/or the top includes, but is not limited to including, at least 30 wt % of $CaCO_3$ and not more than 60 wt % $CaCO_3$. In some embodiments, a probiotic concrete and/or the top includes, but is not limited to including, at least 35 wt % of $CaCO_3$ and not more than 55 wt % $CaCO_3$. In some embodiments, a probiotic concrete and/or the top includes, but is not limited to including, at least 40 wt % of $CaCO_3$ and not more than 50 wt % $CaCO_3$. In some embodiments, a probiotic concrete and/or the top includes, but is not limited to including, at least 30 wt % of $CaCO_3$ and not more than 45 wt % $CaCO_3$. In some embodiments, a probiotic concrete and/or the top includes, but is not limited to including, at least 45 wt % of $CaCO_3$ and not more than 60 wt % $CaCO_3$. In some embodiments, a probiotic concrete and/or the top includes, but is not limited to including, at least 50 wt % of $CaCO_3$ and not more than 80 wt % $CaCO_3$. In some embodiments, a probiotic concrete and/or the top includes, but is not limited to including, at least 30 wt % of $CaCO_3$ and not more than 40 wt % $CaCO_3$. In some embodiments, a probiotic concrete and/or the top includes, but is not limited to including, at least 50 wt % of $CaCO_3$ and not more than 60 wt % $CaCO_3$.

In any of the embodiments described herein, the composition of the top, base, and/or support member is the composition as manufactured prior to placement into water. Thus, the porosity, and % water soluble rocks will change over time once placed in the water.

In some of the embodiments described herein, when referring to the wt % or vol % of a component of the concrete, the total weight excludes rebar and mesh that comprises or is formed from one or more metals such as without limitation, iron or steel.

Similarly, the top, base, and support members may be formed of one or more materials, where each material may be used individually, or in combination with one or more other materials, including, but not limited to including, those materials described herein.

In some embodiments, the top is free of or substantially free of (less than 1 wt %) synthetic polymers.

In some embodiments, the top (or at least one piece of the top if the top is multiple pieces) is free of or substantially free of (less than 1 wt %) synthetic polymers. In some embodiments, the top (or at least one piece of the top if the top is multiple pieces) is free of or includes less than 0.1 wt % synthetic polymers. In some embodiments, the top includes, but is not limited to including, multiple pieces, and all pieces are free of, or includes less than 0.1 wt % synthetic polymers.

In some embodiments, the top (or at least one piece of the top if the top is multiple pieces) is free of or substantially free of (less than 1 wt %) magnetic particles. In some embodiments, the top (or at least one piece of the top if the top is multiple pieces) is free of or includes less than 0.1 wt % magnetic particles. In some embodiments, the top includes, but is not limited to including, multiple pieces, and all pieces are free of, or includes less than 0.1 wt % magnetic particles.

In some embodiments, the surface of the top is rough, that is having a surface roughness between the first and second soil-surface roughness (SSR) with microrelief variations on the order of 1-6 mm (millimeters). A roughness analogy comparing the benthic hard substrate with soil function in terrestrial environments.

In some embodiments, the top, the base, and/or the support member(s) are free of wood, with the exception of cellulose fibers, rayon fibers, and other natural fibers derived from wood, that may be included, individually or in combination, in the natural fibers in the top. In some embodiments, the top, the base, and the support member(s) are all free of wood, with the exception of cellulose fibers, rayon fibers, and other natural fibers derived from wood, that may be included, individually or in combination, in the natural fibers in the top. In some embodiments, "free of wood" means that wood has undergone no processing except size reduction and washing in water and/or soapy water. In other words, as used herein, cellulose extracted from wood is not "wood."

In some embodiments, the top (or at least one piece of the top if multiple pieces) includes, but is not limited to including, a deployment link. As shown in the non-limiting exemplary embodiment of FIG. 1, the deployment link is a U shaped protrusion from the upper surface (top) of the top that is also the top of the unit. The deployment link allows a hook at the end of a crane and/or a forklift to move and deploy the unit. However, the deployment link is not limited to the embodiment depicted in FIG. 1. The deployment link may be in the shape of a hook, and/or a loop (analogous to the eye in a hook and eye clasp). The deployment link may be a large hole in the top that allows the unit to be attached to a hook, a line, and/or a rope. The article may include multiple deployment links. In preferred embodiments, the deployment link is attached to the top, but embodiments of the invention are not so limited. In some embodiments, there are multiple deployment links on an article (unit).

Figure 4:
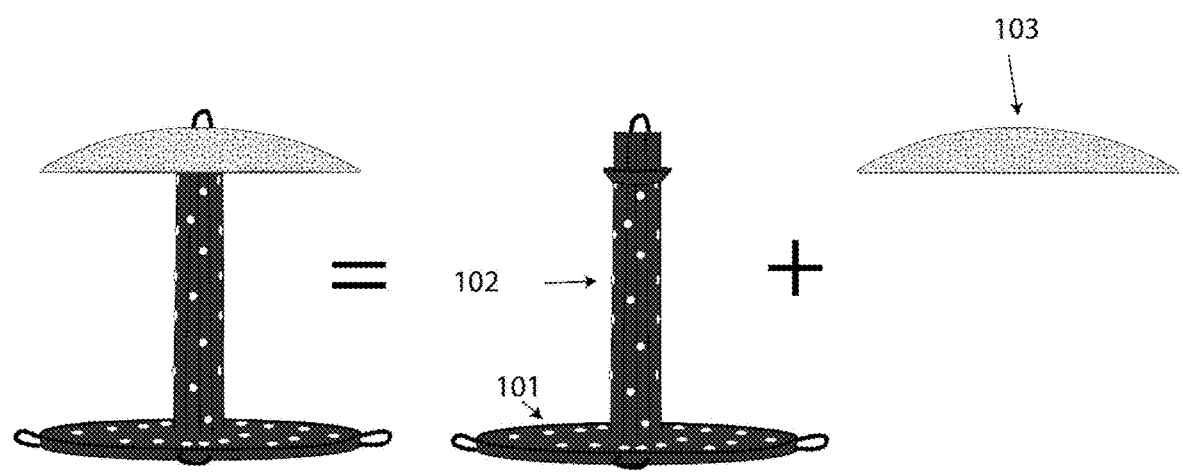
FIG. 4 is a non-limiting embodiment of an article of the present invention subdivided in two sub-articles: 1) Top; and 2) support and base.
Figures 8A, 8B:
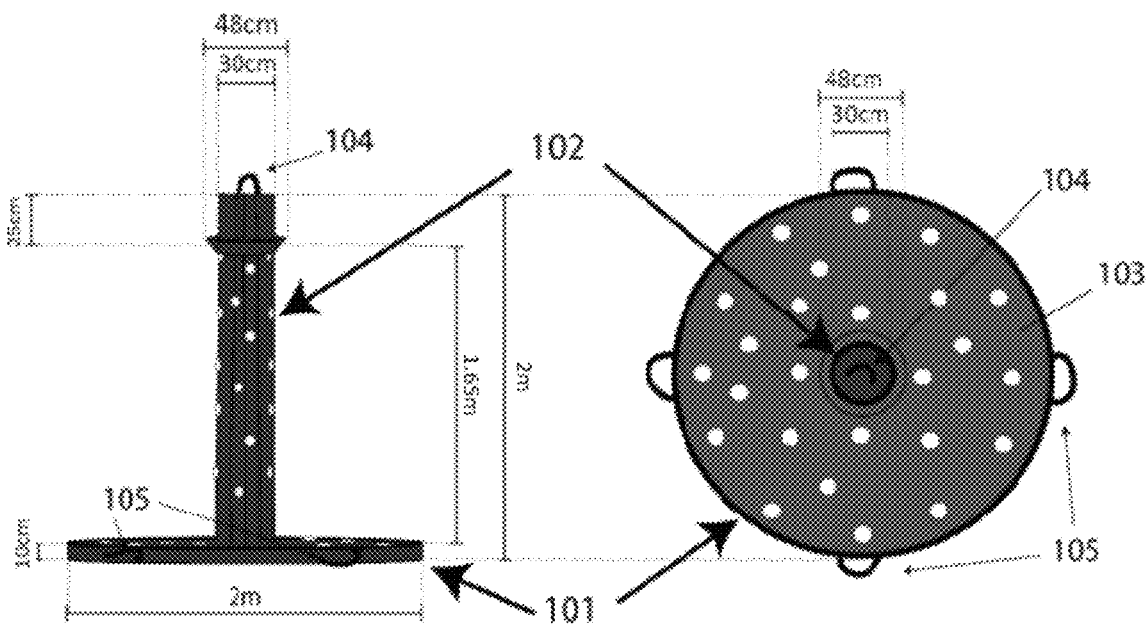
FIGS. 8A and 8B is an illustration of a sub-article of a non-limiting embodiment of an article of the present invention, the article being 2 meters in height, such as, but not limited to, the embodiment illustrated in FIG. 6B.

The connection of the base to the support member, and connection of the support member to the top may be accomplished by methods known in the art. In some embodiments, the base and the support member (column) are integrated forming a single sub-article. In the following description, reference will be made to the specific embodiments illustrated in the Figures, but the embodiments of the present invention are not so limited. In some embodiments, the integrated base and column sub-article is formed as by using a single mold for pre-cast concrete. In some embodiments, the top is a separate sub-article and the top may be formed in another mold for pre-cast concrete. FIG. 4 illustrates an embodiment of the present invention where the unit ("mushroom") includes, but is not limited to including, the two sub-articles, the integrated and base support (sub-article 1) and the top (sub-article 2). The unit illustrated in FIG. 4 may be formed using two different molds for precast concrete, and the two sub-articles are connected to form a single article, an embodiment of the present invention. Embodiments which may be formed of two sub-articles are also illustrated in FIGS. 1 and 6A-6C. In the embodiment illustrated in FIGS. 4, 8, and 9, the two sub-articles are attached by placing the top over the upper portion of support member using the central hole of the top (see central hole (108) of top (103) in FIG. 9). FIGS. 9A-9C presents a more detailed example of a top (103) of an article of a non-limiting embodiment of the present invention and shows a lateral view (FIG. 9A), a top view (FIG. 9B), and a lateral cross-section (FIG. 9C) where the central hole (108) is clearly shown in FIGS. 9B and 9C. In any of the embodiments described herein, in calculating the porosity of an item, a central hole, or the like, used for constructing the article is not included as a "pore," and the volume of the central hole is excluded from the volume of the item. A more detailed illustration is provided in FIG. 8, where the non-limiting embodiment of an article provided in FIG. 8A (that depicts an embodiment of the size of illustrated in FIG. 6B) includes a "lip" (that may also be referred to as a "collar" or protrusion) in the upper portion of the support member of the sub-article 1, the integrated support member and base. This lip is also depicted in the embodiment of FIG. 4. FIG. 8B shows a top view of a non-limiting embodiment of the present invention where the support member (support column) (102) is shown in the middle of the top (103). The lip or protrusion shown around the upper portion of the support member (support column) in FIGS. 4 and 8 is in the form of a ledge or ring with a flat top surface to support the top. The protrusion on the support member to hold the top in place may also be described as being in the shape of a ferrule. The attachment of the top to the support member relies on the mechanical fit between the parts and the weight of the top portion (gravity) to keep the parts together. The physical attachment illustrated in FIGS. 4 and 8 is illustrated as a protrusion or collar around the upper portion of the support member to hold the top in place but embodiments of the present invention are not so limited. Other physical structures may be used to hold the top in place. In some embodiments, the taper of the support column is used to hold the top in place. In some embodiments, one or more "arms" (protrusions) that are not circular in shape may be used to hold the top in place. The protrusion and/or collar may be made of a separate material and may be added or attached after the support member and/or integrated support member/base sub-article have been made. In some embodiments, steel such as that used for reinforcement in concrete, is arranged to protrude from the support member to hold the top in place.

Figure 5:
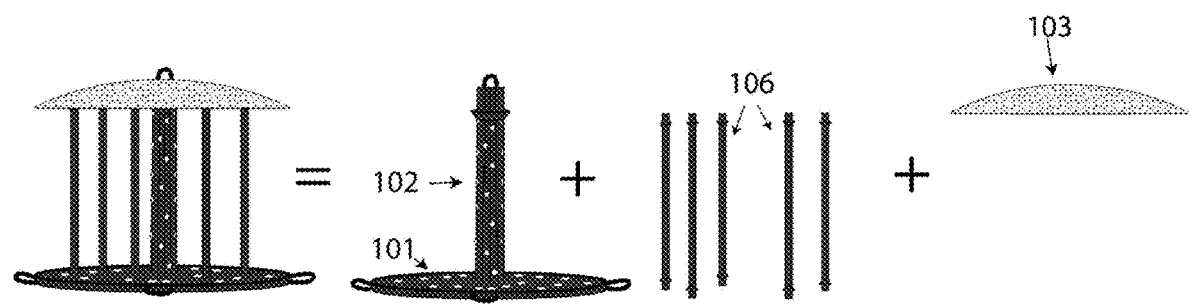
FIG. 5. is an illustration of an embodiment of an article of the present invention where the article is subdivided in three sub-articles: 1) support column and base; 2) lateral supports; and 3) the top.

In some embodiments, there are multiple support members. A non-limiting embodiment of an article (unit, or "mushroom") is illustrated in FIG. 5 which includes multiple additional lateral support members (106). The additional lateral support members (106) are held in place by the weight (gravity) of the top (103). In some embodiments, there are recesses (holes) in the base and/or top which also help to hold the lateral support members in place. The holes in the base for holding the lateral support member(s) may be through holes, or may not be through holes. For the top, it is preferable that the holes for helping support and/or place the lateral support members are not through holes. When present, the lateral supports (FIG. 5) are merely attached in the base and in the top, where the weight of the top keep the supporters attached in the article of the present invention.

In some embodiments, such as but not limited to the embodiments described above and other embodiments described herein, the base and the support member(s) are integrated. In some embodiments, the base and at least one of the support members form an integral unit. In some embodiments there is a base member and only one support member and both a cast together in concrete as an integral pre-cast concrete unit. The angle of the connection of the support member or support members (if multiple) with the top and/or the base will depend upon the number of support members and the shape and size of the support members, and the size and shape of the base, if present. For the non-limiting exemplary embodiment of FIG. 1, there is one support member, and thus the connection to the top and the base should be approximately 90°. However, it is not critical that the connection is exactly 90° and there will be some normal variations due to construction. For the non-limiting exemplary embodiment of FIG. 1, there is one support member, and the support member connections appear to be centered in both the base and the top. However, in some embodiments, the connection at the base and at the top may be off-center. In some embodiments, there are multiple support members that form an angle at the top connection. It is understood that if there is only one support member, the center of gravity of the top should be over the center of the support member if the support member is a column shape. The support member(s) are connected to the top in a manner such that the support member(s) and the base, if present, support the top off of the floor. In other words, when placed in the intended configuration, the top does not touch the floor, and the base, if present, is only connected to the top by one or more support members. One of skill in the art will be able to determine the location of the support members in relation to the top and the base, if present, based on the disclosure herein. In some embodiments, at least one support member includes a bore hole down the middle. In some embodiments, a metal pole can be placed in the bore hole of the at least one support member including a bore hole.

Embodiments of the present invention encompass more than the specific embodiments described and/or shown herein, and numerous variations are possible. As described herein the top may comprise multiple pieces. As described herein, the base may be multiple pieces. In some embodiments, some support members connect to the base and at least one other support member does not connect to the base, but instead rests on the floor. In some embodiments, the top of the support member is tree like with multiple arms supporting multiple pieces of the top or multiple arms supporting a single top or multiple arms support a single piece of the top or, to the extent consistent, some combination thereof. In some embodiments, the support members have large "feet" so there is no need for a base. Alternatively, one could consider that the "base" is integrated with the support element in those non-limiting exemplary embodiments in which the support members include large "feet." In some embodiments, the support member has a borehole through the center that aligns with a borehole or recess in the base and the top.

Embodiments of the present invention encompass articles including, but not limited to including: a top, the water permeability of the top being at least 1000 millidarcy; one or more support members, where each support member comprises a first end and a second end, and the first end of each support member is connected to the top; and optionally, a base, the second end of at least one support member being connected to the base, if present; and where the one or more support members are designed to limit hydrodynamic drag. In some embodiments, the hydrodynamic drag is limited by limiting the surface area of the support members in the direction of water flow when the article is placed underwater. Typically, the direction of water flow will be in a direction parallel (within ±25%) to the floor, and also parallel to the top and the base, if present. For example, a top could be supported by a support member and base being a cylinder of the same dimension of the top. However, an article formed of a cylindrical support of the same diameter as the top presents a large surface area perpendicular to the direction of water flow, and such a support would block the flow of the water. If articles in the shape of a cylinder with a dome on top were to be connected in a similar manner to that of FIG. 2 and placed in a seabed, the cylinders connected together would form a wall with small vertical spaces beween them. Therefore, the resulting structure would limit water flow and require the water to flow between the articles, and/or the structure would be subject to being dragged lower due to the large surface area. Thus, in some embodiments, the largest projected area of the article in a plane perpendicular to the floor is 50% of the "perpendicular area," where the "perpendicular area" is the area formed by drawing an imaginary line along the bottom edge of the top, along the floor, and drawing a perpendicular line from the top down to the floor from the part of the article farthest out on each side of the article. FIGS. 6A-6C illustrate the projected polygon (rectangle) (the "perpendicular area") which is formed by the bottom of the top and the dotted lines on the sides. The "largest projected area" would be determined by rotating the article to find the projected area that is largest which would vary if there were any "arms" or other protrusions extending out from the support member. For a support of a cylinder of the same diameter as the top, the projected area would occupy 100% of the perpendicular area. In some embodiments, the largest projected area of the article in a plane perpendicular to the floor is 40% of the perpendicular area. In some embodiments, the largest projected area of the article in a plane perpendicular to the floor is 35% of the perpendicular area. In some embodiments, the largest projected area of the article in a plane perpendicular to the floor is 30% of the perpendicular area. In some embodiments, the largest projected area of the article in a plane perpendicular to the floor is 25% of the perpendicular area. In some embodiments, the largest projected area of the article in a plane perpendicular to the floor is 20% of the perpendicular area.

Figure 6:
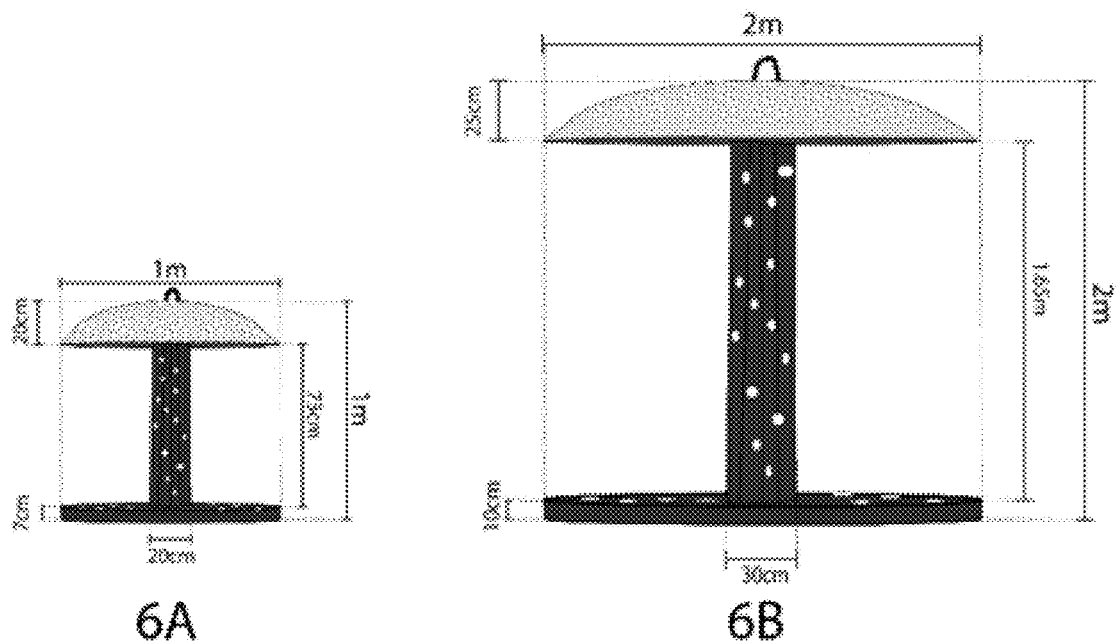
FIG. 6A-C are non-limiting three-dimensional lateral views of embodiments of the present invention that illustrate a range of sizes where the embodiment of FIG. 6A is 1 m high; the embodiment of FIG. 6B is 2 m high; and the embodiment of FIG. 6C is 3 m high.

In some embodiments, the hydrodynamic drag is limited by limiting the surface area of the support members in the direction of water flow when the article is placed underwater, as described herein, and in addition or instead, a substantial section of the article in the middle of a vertical direction is only support member(s). As shown in FIGS. 6A-6C, the lowest point and the highest point of the top define the "top section," and the lowest and highest point of the base define the "base section," with the remaining section being the middle section with the support member(s). In some embodiments, the "top section" does not include the height of deployment links or anchor links, if present, and the "base section" does not include the height of any anchor points, or deployment links, if present. In some embodiments, the middle section with only support member(s) is at least 50% of the total height, and not more than 98% of the total height. In some embodiments, the middle section with only support member(s) is at least 60% of the total height, and not more than 98% of the total height. In some embodiments, the middle section with only support member(s) is at least 65% of the total height, and not more than 98% of the total height. In some embodiments, the middle section with only support member(s) is at least 70% of the total height, and not more than 98% of the total height. In some embodiments, the middle section with only support member(s) is at least 80% of the total height, and not more than 98% of the total height. In some embodiments, the middle section with only support member(s) is at least 85% of the total height, and not more than 98% of the total height. In some embodiments, for a contiguous middle portion of the article of at least 50% of the total height, and not more than 98% of the total height, at least 85% of the hydrodynamic drag is due to the support members. In other words, minor protrusions from the top and/or base into this contiguous section may be present, but they do not produce much hydrodynamic drag. In some embodiments, for a contiguous middle portion of the article of at least 60% of the total height, and not more than 98% of the total height, at least 85% of the hydrodynamic drag is due to the support members. In some embodiments, for a contiguous middle portion of the article of at least 50% of the total height, and not more than 98% of the total height, at least 65% of the hydrodynamic drag is due to the support members. In some embodiments, for a contiguous middle portion of the article of at least 70% of the total height, and not more than 98% of the total height, at least 85% of the hydrodynamic drag is due to the support members. In some embodiments, for a contiguous middle portion of the article of at least 75% of the total height, and not more than 98% of the total height, at least 85% of the hydrodynamic drag is due to the support members. In some embodiments, for a contiguous middle portion of the article of at least 80% of the total height, and not more than 98% of the total height, at least 85% of the hydrodynamic drag is due to the support members. In some embodiments, for a contiguous middle portion of the article of at least 85% of the total height, and not more than 98% of the total height, at least 85% of the hydrodynamic drag is due to the support members. In some embodiments, for a contiguous middle portion of the article of at least 90% of the total height, and not more than 98% of the total height, at least 85% of the hydrodynamic drag is due to the support members. In some embodiments, the top section is at least 1% of the total height, and not more than 30%. In some embodiments, the top section is at least 1% of the total height, and not more than 25%. In some embodiments, the top section is at least 1% of the total height, and not more than 20%. In some embodiments, the top section is at least 1% of the total height, and not more than 18%. In some embodiments, the top section is at least 1% of the total height, and not more than 16%. In some embodiments, the base section is at least 1% of the total height, and not more than 20%. In some embodiments, the base section is at least 1% of the total height, and not more than 18%. In some embodiments, the base section is at least 1% of the total height, and not more than 15%. In some embodiments, the base section is at least 1% of the total height, and not more than 10%. In some embodiments, the base section is at least 1% of the total height, and not more than 8%. In some embodiments of the present invention, the total height of the article (unit) is in the range of 0.5 meters to 3 meters, and in some embodiments, more than 3 meters. In some embodiments of the present invention, the total height of the article (unit) is in the range of 1 to 2 meters, 2 to 3 meters, or 3 to 5 meters. In some embodiments of the present invention, the ratio of the width (larger of the equivalent diameter of the top and the base (if present)) to the total height of the article (unit) is in the range of 0.5 to 10, preferably 0.75, and more preferably, 0.9 to 3.1. In some embodiments of the present invention, the total height of the article (unit) is in the range of 1 to 2 meters, 2 to 3 meters, or 3 to 5 meter, and the ratio of the width (larger of the equivalent diameter of the top and the base (if present)) to the total height of the article (unit) is in the range of 0.5 to 2, 2 to 5, or 5 to 10. FIG. 6 illustrates there non-limiting embodiments of the articles of the present invention with FIGS. 6A, 6B, and 6C depicting different sizes of articles. As discussed above, in some embodiments, the support member, or support members, optionally in combination with the base, if present, support the top at a position in the body of water to allow the top to receive incident light. Thus, the size of the articles, and in particular, the height of the articles may be adjusted to allow the top to receive incident light.

In some embodiments of the present invention, are artificial reefs, the artificial reefs being formed of articles including, but not limited to including: a top, the water permeability of the top being at least from 1000 to 5000 millidarcy; one or more support members, where each support member comprises a first end and a second end, and the first end of each support member is connected to the top; and optionally a base, the second end of at least one support member being connected to the base; and the articles are modular units. The articles (units) are connected at the base or the bottom of one of the one or more support members to form at least part of an artificial reef. In some embodiments, the articles may be deployed in an arrangement on the floor of a body of water, but not connected to each other. In preferred embodiments, at least 50% of the units are connected to at least two other units. In some embodiments, at least 50% of the units are connected to at least four other units. The units may be of the same design or different designs. The units may be of different heights, the units may be the same height, or about the same height (shortest unit is not less than 90% of the height of the highest unit). In preferred embodiments, the units are the same, or a similar design, and the same height, or about the same height (shortest unit is not less than 90% of the height of the highest unit). In some embodiments, the "same height" means a standard deviation of less than 5% of the average height.

Embodiments of the present invention include, but are not limited to including, methods of making articles, the articles useful for forming artificial reefs. The methods of making include, but are not limited to including, forming one or more support members; forming a top with the water permeability of the top being at least 1000 millidarcy; and connecting the top to one end of the one or more support members. In some embodiments, the top includes, but is not limited to including, a deployment link. In some embodiments, at least one of the one or more support members includes an anchor point. In some embodiments, the method also includes, but is not limited to including, forming a base and connecting at least one of end of one of the one or more support members to the base where the end of the support member connected to the base is a different end of the support member than that connected to the top. In some embodiments, the base includes one or more anchor points. In some embodiments, at least one of the one or more support members is a central support member (column) that is integrated with the base forming a single sub-article, and the single sub-article is made in a single precast-mold (see for example, the integrated support member and base, sub-article 1, of FIGS. 4 and 5). In some embodiments, a single pre-cast concrete sub-article including a base and a central support member that are integrated is made, and the top is a separately made sub-article that is made in another precast-mold with concrete (see FIGS. 4 and 5). The pre-cast top with a central hole (as shown, for example, in FIG. 8) is fit over the upper end of the support member of the sub-article including an integrated base and support member as illustrated in FIGS. 4 and 5. As shown in FIG. 5, in some embodiments, there are additional support members providing lateral support to the top. Methods of forming articles of pre-cast concrete using molds are well-known in the art. In some embodiments, the manufacture of the top includes, but is not limited to including, using a pre-cast mold to form the top and aerating the concrete poured into the mold. In some embodiments, aeration is accomplished by simple gas injection (gases such as, but not limited to air, $CO_2$, He, $O_2$, $N_2$, and combinations thereof), creating small bubbles within the structure.

Figures 7A, 7B:
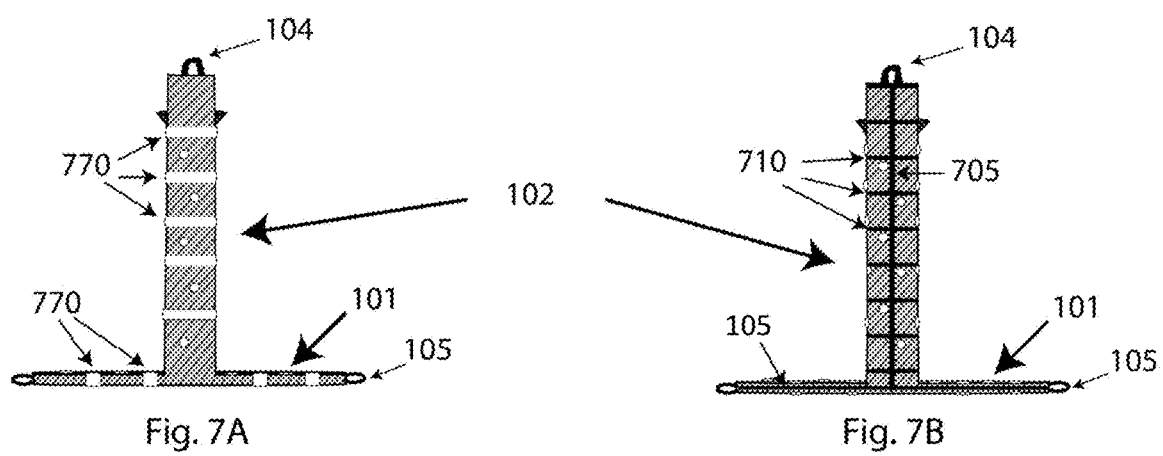
FIGS. 7A and 7B are cross-sectional lateral views of a sub-article 2 (base+column) of an embodiment of the present invention: 7A is a non-limiting depiction of the holes and 7B is a non-limiting depiction of the steel reinforcement.
Figure 7C:
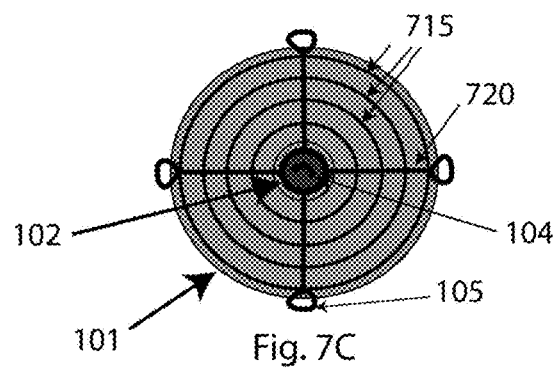
FIG. 7C is a schematic top view of the sub-article 2 of an embodiment of the present invention, such as that illustrated in FIGS. 7A and 7B, with a non-limiting depiction of steel reinforcement.

In some embodiments, the pre-cast concrete includes, but is not limited to including, reinforcement with steel, rocks, and/or natural fibers. FIGS. 7A and 7B depict lateral cross-sectional views of a sub-article 1 (integrated base and support) of a non-limiting embodiment of an article of the present invention with and without steel reinforcement. As illustrated in FIG. 7A, there are through holes (770) in both the base (101) and the support member (102). As illustrated in the non-limiting embodiment of FIG. 7B, there is an axial steel reinforcement (705) and steel reinforcement rings (710) in the support column (102). FIG. 7C is a top view of a cross-section in the z-axis of the base (101) of a non-limiting embodiment of an article of the present invention, and the cross-sectional view illustrates steel reinforcement in the concrete. As shown in FIG. 7C, there are steel reinforcement rods (720) extending outward in a radial direction and ending with the anchor points (105) as well as steel reinforcement rings (715) in the base (101).

Embodiments of the present invention also encompass additional embodiments in which a mass to mass ratio is used in any embodiments described herein that recite a weight to weight ratio. Embodiments of the present invention also encompass additional embodiments in which a percent (%) by mass is used in any embodiments described herein that recite a percent by weight (wt %).

Embodiments of the present invention include, but are not limited to including, methods of forming artificial reefs. The methods include, but are not limited to including, deploying a unit, the unit being an article including, but not limited to including, a top, the water permeability of the top being at least millidarcy; one or more support members, where each support member comprises a first end and a second end, and the first end of each support member is connected to the top; and optionally a base, the second end of at least one support member being connected to the base, if present; and deploying includes, but is not limited to including, placing at least two units on the bottom (or floor) of a body of water, and optionally, connecting the units or partially connecting the units to each other. In some embodiments, deployment includes, but is not limited to including, attaching a hook and/or chain to a deployment link on at least one unit and lowering the at least on unit into the body of water until is rests on the bottom of the body of water, and subsequently removing the hook and/or chain. In some embodiments, the method further includes, but is not limited to including, connecting at least one unit on the bottom of the body of water to at least one other unit on the bottom of the body of water where connecting comprises using a chain to connect the units. The units may be arranged and/or connected in any configuration. In preferred embodiments, a number of units are arranged and connected to form a "forest" similar to that shown in FIG. 2. Specifically, in preferred embodiments, the articles, also called units, are connected underwater by linking the fixed anchor points (see FIG. 1) to form an assemblage of articles (units) and it is the final assemblage that creates the final shape of the artificial reef presented here. The fixed anchor points in the base of the articles are attached using, but not limited to using, anchor shackles. As shown in FIG. 10A, the artificial reef may be an assemblage of articles (or units) of a single article size, or as shown in FIG. 10B, the artificial reef may be an assemblage of articles (or units) combining different sizes in an assemblage. As non-limiting embodiments, for shallow water, with a depth of 1.5-2 meters, a reef formed of articles of about 1 meter in height, such as, but not limited to, the embodiment depicted in FIG. 6A, may be used, and for sites where the water depth is on the order of 3-4 meters, a reef formed of articles of a height of about 2 meters, such as, but not limited to, the embodiment depicted in FIG. 6B, may be used. In other non-limiting embodiments, for sites with a water depth on the order of 5-6 meters, a reef formed of articles of a height of about 3 meters, such as, but not limited to, the embodiment depicted in FIG. 6C, may be used. In other non-limiting embodiments, if the water site has a depth of more than 10 meters, an artificial reef formed of articles (units) of a height greater than 3 meters may be used, and the top and/or base may be significantly larger than the size of the top and the base of the embodiment depicted in FIG. 6C. One of skill in the art will be able to determine the appropriate dimensions based upon the disclosure herein.

In preferred embodiments of the present invention, the article includes, but is not limited to including, a base in the shape of a disk (a short cylinder) attached to a tapered support column with a cross-section approximately (within 90%) in the shape of a circle, oval, polygon, or the like, with the larger end at the base, and the support column connected to a top in the shape of a hemi-sphere, a section of a sphere, a dome, a dome-shaped object, or the like, the top including, but not limited to including, a deployment link in the shape of a loop included on the top of the article. In preferred embodiments, the base includes at least two anchor points. In preferred embodiments, the ratio of the diameter of the top to the diameter of the base is in the range of 0.85 to 1.15. In preferred embodiments of the present invention, the support column and base are formed of reinforced concrete and the top is formed of a concrete of a lower density due to porosity in the concrete, and the top including a higher weight percent calcium carbonate than the support and base. In some embodiments, the weight percent calcium carbonate in the top is at least 10% higher than the weight percent calcium carbonate in the base and/or support. In preferred embodiments, the top includes, but is not limited to including, natural fibers in the concrete. As a non-limiting example, if the support is 10 wt % calcium carbonate, the top is at least 11 wt % calcium carbonate. In some embodiments, the weight percent calcium carbonate in the top is at least 15% higher than the weight percent calcium carbonate in the base and/or support. In some embodiments, the weight percent calcium carbonate in the top is at least 20% higher than the weight percent calcium carbonate in the base and/or support. In some embodiments, the weight percent calcium carbonate in the top is at least 25% higher than the weight percent calcium carbonate in the base and/or support.

Some non-limiting embodiments of the present invention are described as follows:

Embodiment 1: An article including, but not limited to including, the following: a top, the water permeability of the top being at least 1000 millidarcy, and not more than 5000 millidarcy; one or more support members, each support member including, but not limited to including, a first end and a second end, the first end of the one or more support members being connected to the top; and optionally a base, the second end of at least one support member being connected to the base (if present).

Embodiment 2: In some embodiments, such as but not limited to embodiment 1, the water permeability of the top being at least 1200 millidarcy.

Embodiment 3: In some embodiments, such as but not limited to embodiment 1, the water permeability of the top being at least 1500 millidarcy.

Embodiment 4: In some embodiments, such as but not limited to embodiment 1, the water permeability of the top being at least 2000 millidarcy.

Embodiment 5: In some embodiments, such as but not limited to embodiment 1, the water permeability of the top being at least 3000 millidarcy.

Embodiment 6: In some embodiments, such as but not limited to embodiments 1-5, the water permeability of the top is at least 10% greater than the water permeability of at least one of the one or more support members, the water permeability of the optional base, or both.

Embodiment 7: In some embodiments, such as but not limited to embodiments 1-5, the water permeability of the top is at least 15% greater than the water permeability of at least one of the one or more support members, the water permeability of the optional base, or both.

Embodiment 8: In some embodiments, such as but not limited to embodiments 1-5, the water permeability of the top is at least 20% greater than the water permeability of at least one of the one or more support members, the water permeability of the optional base, or both.

Embodiment 9: In some embodiments, such as but not limited to embodiments 1-5, the water permeability of the top is at least 25% greater than the water permeability of at least one of the one or more support members, the water permeability of the optional base, or both.

Embodiment 10: In some embodiments, such as but not limited to embodiments 1-9, the top is at least 5% less dense than the one or more support members and the top is at least 5% less dense than the base, if present.

Embodiment 11: In some embodiments, such as but not limited to embodiments 1-9, the top is at least 10% less dense than the one or more support members and the top is at least 10% less dense than the base, if present.

Embodiment 12: In some embodiments, such as but not limited to embodiments 1-9, the top is at least 15% less dense than the one or more support members and the top is at least 15% less dense than the base, if present.

Embodiment 13: In some embodiments, such as but not limited to embodiments 1-12, the top has a porosity of at least 10% and not more than 45%.

Embodiment 14: In some embodiments, such as but not limited to embodiments 1-13, the top has a porosity of at least 12%.

Embodiment 15: In some embodiments, such as but not limited to embodiments 1-13, the top has a porosity of at least 15%.

Embodiment 16: In some embodiments, such as but not limited to embodiments 1-13, the top has a porosity of at least 20%.

Embodiment 17: In some embodiments, such as but not limited to embodiments 1-13, the top has a porosity of at least 25%.

Embodiment 18: In some embodiments, such as but not limited to embodiments 1-13, the top has a porosity of at least 30%.

Embodiment 19: In some embodiments, such as but not limited to embodiments 1-13, the top has a porosity of at least 35%.

Embodiment 20: In some embodiments, such as but not limited to embodiments 1-19, the top comprises at least 30 wt % $CaCO_3$.

Embodiment 21: In some embodiments, such as but not limited to embodiments 1-19, the top comprises at least 35 wt % $CaCO_3$.

Embodiment 22: In some embodiments, such as but not limited to embodiments 1-19, the top comprises at least 40 wt % $CaCO_3$.

Embodiment 23: In some embodiments, such as but not limited to embodiments 1-19, the top comprises at least 50 wt % $CaCO_3$.

Embodiment 24: In some embodiments, such as but not limited to embodiments 20-23, the top comprises not more than 60 wt % $CaCO_3$.

Embodiment 25: In some embodiments, such as but not limited to embodiments 1-24, the wt % $CaCO_3$ of the top is at least 5% greater than the wt % $CaCO_3$ of at least one of the one or more support members, the wt % $CaCO_3$ of the optional base, or both.

Embodiment 26: In some embodiments, such as but not limited to embodiments 1-24, the wt % $CaCO_3$ of the top is at least 10% greater than the wt % $CaCO_3$ of at least one of the one or more support members, the wt % $CaCO_3$ of the optional base, or both.

Embodiment 27: In some embodiments, such as but not limited to embodiments 1-24, the wt % $CaCO_3$ of the top is at least 15% greater than the wt % $CaCO_3$ of at least one of the one or more support members, the wt % $CaCO_3$ of the optional base, or both.

Embodiment 28: In some embodiments, such as but not limited to embodiments 1-24, the wt % $CaCO_3$ of the top is at least 20% greater than the wt % $CaCO_3$ of at least one of the one or more support members, the wt % $CaCO_3$ of the optional base, or both.

Embodiment 29: In some embodiments, such as but not limited to embodiments 1-24, the wt % $CaCO_3$ of the top is at least 25% greater than the wt % $CaCO_3$ of at least one of the one or more support members, the wt % $CaCO_3$ of the optional base, or both.

Embodiment 30: In some embodiments, such as but not limited to embodiments 1-29, the top comprises natural fibers.

Embodiment 31: In some embodiments, such as but not limited to embodiment 30, the natural fibers comprise 0.5 wt % to 90 wt % of the top.

Embodiment 32: In some embodiments, such as but not limited to embodiment 30, the natural fibers comprise 1 wt % to 75 wt % of the top.

Embodiment 33: In some embodiments, such as but not limited to embodiment 30, the natural fibers comprise 2 wt % to 65 wt % of the top.

Embodiment 34: In some embodiments, such as but not limited to embodiment 30, the natural fibers comprise 2.5 wt % to 50 wt % of the top.

Embodiment 35: In some embodiments, such as but not limited to embodiment 30, the natural fibers comprise 3 wt % to 35 wt % of the top.

Embodiment 36: In some embodiments, such as but not limited to embodiments 30-35, the natural fibers comprise, but are not limited to, cotton, silk, hemp, flax, wood pulp, other natural fibers for concrete reinforcements traded and used in the building market (fibers without chemicals), or a combination thereof.

Embodiment 37: In some embodiments, such as but not limited to embodiments 1-36, the top includes, but is not limited to including, water soluble rocks.

Embodiment 38: In some embodiments, such as but not limited to embodiment 37, the water soluble rocks comprise 3 wt % to 60 wt % of the top.

Embodiment 39: In some embodiments, such as but not limited to embodiment 37, the water soluble rocks comprise 4 wt % to 55 wt % of the top.

Embodiment 40: In some embodiments, such as but not limited to embodiment 37, the water soluble rocks comprise 5 wt % to 50 wt % of the top.

Embodiment 41: In some embodiments, such as but not limited to embodiment 37, the water soluble rocks comprise 10 wt % to 40 wt % of the top.

Embodiment 42: In some embodiments, such as but not limited to embodiments 37-42, the water soluble rocks include, but are not limited to including, $CaCO_3$, NaCl, and combinations thereof.

Embodiment 43: In some embodiments, such as but not limited to embodiments 1-42, the top comprises one or more materials, the one or more materials including, but not limited to including concrete.

Embodiment 44: In some embodiments, such as but not limited to embodiments 1-43, the top is in the shape of a cylinder where the height of the cylinder is not more than 50% of the radius of the cylinder.

Embodiment 45: In some embodiments, such as but not limited to embodiments 1-43, the top is in the shape of a section of a sphere.

Embodiment 46: In some embodiments, such as but not limited to embodiments 1-43, the top is in the shape of a hemi-sphere.

Embodiment 47: In some embodiments, such as but not limited to embodiments 1-43, the top is in the shape of a dome.

Embodiment 48: In some embodiments, such as but not limited to, embodiments 1-47, the height of the top is not more 35% of the equivalent diameter of the projected area of the top of the article, when projected on the floor.

Embodiment 49: In some embodiments, such as but not limited to, embodiments 1-47, the height of the top is not more 30% of the equivalent diameter of the projected area of the top of the article, when projected on the floor.

Embodiment 50: In some embodiments, such as but not limited to, embodiments 1-47, the height of the top is not more 25% of the equivalent diameter of the projected area of the top of the article, when projected on the floor.

Embodiment 51: In some embodiments, such as but not limited to, embodiments 1-47, the height of the top is not more 20% of the equivalent diameter of the projected area of the top of the article, when projected on the floor.

Embodiment 52: In some embodiments, such as but not limited to, embodiments 1-47, the height of the top is not more 15% of the equivalent diameter of the projected area of the top of the article, when projected on the floor.

Embodiment 53: In some embodiments, such as but not limited to, embodiments 1-47, the height of the top is not more 13% of the equivalent diameter of the projected area of the top of the article, when projected on the floor.

Embodiment 54: In some embodiments, such as but not limited to, embodiments 1-53, the height of the top is not less than 0.05% of the equivalent diameter of the projected area of the top of the article, when projected on the floor.

Embodiment 55: In some embodiments, such as but not limited to embodiments 1-54, the article comprises a floor contact area, and a projected area of the top of the article, when projected on the floor, is 50% to 150% of the floor contact area.

Embodiment 56: In some embodiments, such as but not limited to embodiments 1-54, the article comprises a floor contact area, and a projected area of the top of the article, when projected on the floor, is 60% to 140% of the floor contact area.

Embodiment 57: In some embodiments, such as but not limited to embodiments 1-54, the article comprises a floor contact area, and a projected area of the top of the article, when projected on the floor, is 70% to 130% of the floor contact area.

Embodiment 58: In some embodiments, such as but not limited to embodiments 1-54, the article comprises a floor contact area, and a projected area of the top of the article, when projected on the floor, is 75% to 125% of the floor contact area.

Embodiment 59: In some embodiments, such as but not limited to embodiments 1-54, the article comprises a floor contact area, and a projected area of the top of the article, when projected on the floor, is 80% to 120% of the floor contact area.

Embodiment 60: In some embodiments, such as but not limited to embodiments 1-54, the article comprises a floor contact area, and a projected area of the top of the article, when projected on the floor, is 85% to 115% of the floor contact area.

Embodiment 61: In some embodiments, such as but not limited to embodiments 1-54, the article comprises a floor contact area, and a projected area of the top of the article, when projected on the floor, is 90% to 110% of the floor contact area.

Embodiment 62: In some embodiments, such as but not limited to embodiments 1-61, the article comprises a floor contact area, and a projected area of the top of the article, when projected on the floor, overlaps at least 75% of the floor contact area.

Embodiment 63: In some embodiments, such as but not limited to embodiments 1-61, the article comprises a floor contact area, and a projected area of the top of the article, when projected on the floor, overlaps at least 80% of the floor contact area.

Embodiment 64: In some embodiments, such as but not limited to embodiments 1-61, the article comprises a floor contact area, and a projected area of the top of the article, when projected on the floor, overlaps at least 85% of the floor contact area.

Embodiment 65: In some embodiments, such as but not limited to embodiments 1-61, the article comprises a floor contact area, and a projected area of the top of the article, when projected on the floor, overlaps at least 85% of the floor contact area.

Embodiment 66: In some embodiments, such as but not limited to embodiments 1-61, the article comprises a floor contact area, and a projected area of the top of the article, when projected on the floor, overlaps at least 95% of the floor contact area.

Embodiment 67: In some embodiments, such as but not limited to embodiments 1-61, the article comprises a floor contact area, and a projected area of the top of the article, when projected on the floor, overlaps at least 98% of the floor contact area.

Embodiment 68: In some embodiments, such as but not limited to embodiments 1-67, the top comprises two or more top pieces.

Embodiment 69: In some embodiments, such as but not limited to embodiments 1-68, article includes one or more deployment links.

Embodiment 70: In some embodiments, such as but not limited to embodiment 69, at least one of the deployment links is part of the top.

Embodiment 71: In some embodiments, such as but not limited to embodiments 1-70, for at least one support member the height (dimension in z axis as illustrated in FIG. 1) is at least 2 times the diameter of a circle of the same area as the cross-sectional area of the support member at half-height (one half of the z-axis direction) and/or the diameter of a circle of the same area as the average cross-sectional area of the support.

Embodiment 72: In some embodiments, such as but not limited to embodiments 1-70, for at least one support member the height (dimension in z axis as illustrated in FIG. 1) is at least 2.5 times the diameter of a circle of the same area as the cross-sectional area of the support member at half-height (one half of the z-axis direction) and/or the diameter of a circle of the same area as the average cross-sectional area of the support.

Embodiment 73: In some embodiments, such as but not limited to embodiments 1-70, for at least one support member the height (dimension in z axis as illustrated in FIG. 1) is at least 3 times the diameter of a circle of the same area as the cross-sectional area of the support member at half-height (one half of the z-axis direction) and/or the diameter of a circle of the same area as the average cross-sectional area of the support.

Embodiment 74: In some embodiments, such as but not limited to embodiments 1-70, for at least one support member the height (dimension in z axis as illustrated in FIG. 1) is at least 3.5 times the diameter of a circle of the same area as the cross-sectional area of the support member at half-height (one half of the z-axis direction) and/or the diameter of a circle of the same area as the average cross-sectional area of the support.

Embodiment 75: In some embodiments, such as but not limited to embodiments 1-70, for at least one support member the height (dimension in z axis as illustrated in FIG. 1) is at least 4 times the diameter of a circle of the same area as the cross-sectional area of the support member at half-height (one half of the z-axis direction) and/or the diameter of a circle of the same area as the average cross-sectional area of the support.

Embodiment 76: In some embodiments, such as but not limited to embodiments 1-70, for at least one support member the height (dimension in z axis as illustrated in FIG. 1) is at least 6 times the diameter of a circle of the same area as the cross-sectional area of the support member at half-height (one half of the z-axis direction) and/or the diameter of a circle of the same area as the average cross-sectional area of the support.

Embodiment 77: In some embodiments, such as but not limited to embodiments 1-70, for at least one support member the height (dimension in z axis as illustrated in FIG. 1) is at least 8 times the diameter of a circle of the same area as the cross-sectional area of the support member at half-height (one half of the z-axis direction) and/or the diameter of a circle of the same area as the average cross-sectional area of the support.

Embodiment 78: In some embodiments, such as but not limited to embodiments 1-77, for at least one support member, the support member includes, but is not limited to including, protrusions, arms, and/or cross bars.

Embodiment 79: In some embodiments, such as but not limited to embodiments 1-77, for at least one support member 70% of the height of the support member of the support member does not include protrusions, arms, and/or cross bars.

Embodiment 80: In some embodiments, such as but not limited to embodiments 1-77, for at least one support member 75% of the height of the support member does not include protrusions, arms, and/or cross bars.

Embodiment 81: In some embodiments, such as but not limited to embodiments 1-77, for at least one support member 80% of the height of the support member does not include protrusions, arms, and/or cross bars.

Embodiment 82: In some embodiments, such as but not limited to embodiments 1-77, for at least one support member 85% of the height of the support member does not include protrusions, arms, and/or cross bars.

Embodiment 83: In some embodiments, such as but not limited to embodiments 1-77, for at least one support member 90% of the height of the support member does not include protrusions, arms, and/or cross bars.

Embodiment 84: In some embodiments, such as but not limited to embodiments 1-77, for at least one support member 95% of the height of the support member does not include protrusions, arms, and/or cross bars.

Embodiment 85: In some embodiments, such as but not limited to embodiments 1-77, for at least one support member, the support member only include protrusions, arms, and/or cross bars within the bottom 10% of the height and/or the top 10% of the height.

Embodiment 86: In some embodiments, such as but not limited to embodiments 1-77, for at least one support member, the support member does not include protrusions, arms, and/or cross bars.

Embodiment 87: In some embodiments, such as but not limited to embodiments 1-86, at least one support member is a column.

Embodiment 88: In some embodiments, such as but not limited to, embodiment 87, where the cross-section of the column is a circle.

Embodiment 89: In some embodiments, such as but not limited to embodiment 87, where the cross-section of the column is an oval.

Embodiment 90: In some embodiments, such as but not limited to embodiment 87, where the cross-section of the column is a polygon of three or more sides.

Embodiment 91: In some embodiments, such as but not limited to embodiments 87-90, the column is tapered.

Embodiment 92: In some embodiments, such as but not limited to embodiment 91, the ratio of cross-sectional area of the small end of the column to the large end of the column is in the range of about 0.15 to about 0.98.

Embodiment 93: In some embodiments, such as but not limited to embodiment 91, the ratio of the ratio of cross-sectional area of the small end of the column to the large end of the column is in the range of about 0.10 to about 0.75.

Embodiment 94: In some embodiments, such as but not limited to embodiment 91, the ratio of the ratio of cross-sectional area of the small end of the column to the large end of the column is in the range of about 0.70 to about 0.90.

Embodiment 95: In some embodiments, such as but not limited to embodiment 91, the ratio of cross-sectional area of the small end of the column to the large end of the column is in the range of about 0.20 to about 0.75.

Embodiment 96: In some embodiments, such as but not limited to embodiment 91, the ratio of cross-sectional area of the small end of the column to the large end of the column is in the range of about 0.5 to about 0.98.

Embodiment 97: In some embodiments, such as but not limited to embodiment 91, the ratio of cross-sectional area of the small end of the column to the large end of the column is in the range of about 0.7 to about 0.95.

Embodiment 98: In some embodiments, such as but not limited to embodiments 91-97, the end with the smaller cross-sectional area is the end connected to the top.

Embodiment 99: In some embodiments, such as but not limited to embodiments 1-98, the average cross-sectional area of the support member or the sum of the average cross-sectional areas of the support members is not more than 35% of the projected area of the top when projected on the floor.

Embodiment 100: In some embodiments, such as but not limited to embodiments 1-98, the average cross-sectional area of the support member or the sum of the average cross-sectional areas of the support members is not more than 30% of the projected area of the top when projected on the floor.

Embodiment 101: In some embodiments, such as but not limited to embodiments 1-98, the average cross-sectional area of the support member or the sum of the average cross-sectional areas of the support members is not more than 25% of the projected area of the top when projected on the floor.

Embodiment 102: In some embodiments, such as but not limited to embodiments 1-98, the average cross-sectional area of the support member or the sum of the average cross-sectional areas of the support members is not more than 20% of the projected area of the top when projected on the floor.

Embodiment 103: In some embodiments, such as but not limited to embodiments 1-98, the average cross-sectional area of the support member or the sum of the average cross-sectional areas of the support members is not more than 15% of the projected area of the top when projected on the floor.

Embodiment 104: In some embodiments, such as but not limited to embodiments 1-98, the average cross-sectional area of the support member or the sum of the average cross-sectional areas of the support members is not more than 10% of the projected area of the top when projected on the floor.

Embodiment 105: In some embodiments, such as but not limited to embodiments 1-98, the average cross-sectional area of the support member or the sum of the average cross-sectional areas of the support members is not more than 5% of the projected area of the top when projected on the floor.

Embodiment 106: In some embodiments, such as but not limited to embodiments 1-105, the average cross-sectional area of the support member or the sum of the average cross-sectional areas of the support members is not less than 0.5% of the projected area of the top when projected on the floor.

Embodiment 107: In some embodiments, such as but not limited to embodiments 1-98, the article comprises a floor contact area, and the average cross-sectional area of the support member or the sum of the average cross-sectional area of the support members is not more than 50% of the floor contact area.

Embodiment 108: In some embodiments, such as but not limited to embodiments 1-98, the article comprises a floor contact area, and the average cross-sectional area of the support member or the sum of the average cross-sectional area of the support members is not more than 40% of the floor contact area.

Embodiment 109: In some embodiments, such as but not limited to embodiments 1-98, the article comprises a floor contact area, and the average cross-sectional area of the support member or the sum of the average cross-sectional area of the support members is not more than 30% of the floor contact area.

Embodiment 110: In some embodiments, such as but not limited to embodiments 1-98, the article comprises a floor contact area, and the average cross-sectional area of the support member or the sum of the average cross-sectional area of the support members is not more than 25% of the floor contact area.

Embodiment 111: In some embodiments, such as but not limited to embodiments 1-98, the article comprises a floor contact area, and the average cross-sectional area of the support member or the sum of the average cross-sectional area of the support members is not more than 20% of the floor contact area.

Embodiment 112: In some embodiments, such as but not limited to embodiments 1-98, the article comprises a floor contact area, and the average cross-sectional area of the support member or the sum of the average cross-sectional area of the support members is not more than 15% of the floor contact area.

Embodiment 113: In some embodiments, such as but not limited to embodiments 1-98, the article comprises a floor contact area, and the average cross-sectional area of the support member or the sum of the average cross-sectional area of the support members is not more than 10% of the floor contact area.

Embodiment 114: In some embodiments, such as but not limited to embodiments 1-98, the article comprises a floor contact area, and the average cross-sectional area of the support member or the sum of the average cross-sectional area of the support members is not more than 5% of the floor contact area.

Embodiment 115: In some embodiments, such as but not limited to embodiments 1-114, the article comprises a floor contact area, and the average cross-sectional area of the support member or the sum of the average cross-sectional area of the support members is not less than 0.1% of the floor contact area.

Embodiment 116: In some embodiments, such as but not limited to embodiments 1-115, at least one of the one or more support members comprises one or more through holes.

Embodiment 117: In some embodiments, such as but not limited to embodiment 116, for at least one of the support member comprising through-holes, the through holes are 10% to 50% of the surface area of the support member.

Embodiment 118: In some embodiments, such as but not limited to embodiment 116, for at least one of the support member comprising through-holes, the through holes are 15% to 35% of the surface area of the support member.

Embodiment 119: In some embodiments, such as but not limited to embodiment 116, for at least one of the support member comprising through-holes, the through holes are 10% to 25% of the surface area of the support member.

Embodiment 120: In some embodiments, such as but not limited to embodiment 116, for at least one of the support members comprising through-holes, the through holes are 10% to 25% of the surface area of the support member.

Embodiment 121: In some embodiments, such as but not limited to embodiment 116, for at least one of the support members comprising through-holes, the through holes are 10% to 20% of the surface area of the support member.

Embodiment 122: In some embodiments, such as but not limited to embodiment 116, for at least one of the support members comprising through-holes, the through holes are 10% to 20% of the surface area of the support member.

Embodiment 123: In some embodiments, such as but not limited to embodiments 116-122, for at least one of the support members comprising through-holes, fewer than 5% of the through holes intersect with another through hole.

Embodiment 124: In some embodiments, such as but not limited to embodiment 116, for at least one of the support members comprising through-holes, the porosity of the support member is in the range of 5% to 55%.

Embodiment 125: In some embodiments, such as but not limited to embodiment 116, for at least one of the support members comprising through-holes, the porosity of the support member is in the range of 15% to 55%.

Embodiment 126: In some embodiments, such as but not limited to embodiment 116, for at least one of the support members comprising 20% to 55%.

Embodiment 127: In some embodiments, such as but not limited to embodiment 116, for at least one of the support members comprising through-holes, the porosity of the support member is in the range of 8% to 45%.

Embodiment 128: In some embodiments, such as but not limited to embodiment 116, for at least one of the support members comprising through-holes, the porosity of the support member is in the range of 10% to 35%.

Embodiment 129: In some embodiments, such as but not limited to embodiment 116, for at least one of the support members comprising through-holes, the porosity of the support member is in the range of 10% to 25%.

Embodiment 130: In some embodiments, such as but not limited to embodiment 116, for at least one of the support members comprising through-holes, the porosity of the support member is in the range of 15% to 30%.

Embodiment 131: In some embodiments, such as but not limited to embodiment 116, for at least one of the support members comprising through-holes, the porosity of the support member is in the range of 6% to 12%.

Embodiment 132: In some embodiments, such as but not limited to embodiments 116-131, at least some of the through-holes are circular or nearly circular with a diameter in the range of 5 to 10 cm.

Embodiment 133: In some embodiments, such as but not limited to embodiments 116-131, at least some of the through-holes are circular or nearly circular with a diameter in the range of 5 to 15 cm.

Embodiment 134: In some embodiments, such as but not limited to embodiment 116-133, if multiple support members are present, all support members include, but are not limited to including, through holes.

Embodiment 135: In some embodiments, such as but not limited to embodiment 1-134, only one support member is present.

Embodiment 136: In some embodiments, such as but not limited to embodiment 1-134, two or more support members are present.

Embodiment 137: In some embodiments, such as but not limited to embodiments 1-136, the support member or at least one support member comprises one or more materials, the one or more materials being material used for construction of items intended for seawater submersion.

Embodiment 138: In some embodiments, such as but not limited to embodiments 1-136, the support member or at least one support member comprises one or more materials, the one or more materials being materials used for artificial reefs.

Embodiment 139: In some embodiments, such as but not limited to embodiments 1-136, the support member or at least one support member comprises one or more materials, all materials being environmentally friendly, without chemicals, with neutral pH, and using natural products and therefore not affecting the chemical characteristics of the water masses around the reefs.

Embodiment 140: In some embodiments, such as but not limited to embodiments 1-136, the support member or at least one support member comprises one or more materials, the one or more materials including, but not limited to including, concrete.

Embodiment 141: In some embodiments, such as but not limited to embodiment 140, the concrete is reinforced with steel, one or more metals, one or more types of natural fibers, rocks, or any combination thereof.

Embodiment 142: In some embodiments, such as but not limited to embodiments 140 and 141, the concrete is free of chemical additives.

Embodiment 143: In some embodiments, such as but not limited to embodiment 140, the concrete comprises one or more types of concrete, at least one of the one or more types of concrete being selected from the group consisting of CP I, CP V ARI, CP II 32 E, CP II 32 F, and combinations thereof.

Embodiment 144: In some embodiments, such as but not limited to embodiments 140-143, the concrete is a precast concrete used for manufacturing articles in molds and is not a sprayable concrete.

Embodiment 145: In some embodiments, such as but not limited to embodiments 140-144, the concrete is steel reinforced concrete.

Embodiment 146: In some embodiments, such as but not limited to embodiment 140-145, the concrete is of neutral pH.

Embodiment 147: In some embodiments, such as but not limited to embodiments 140-146, the concrete has high durability and resistance that includes a high proportion (at least 20 wt % of the formed concrete) of rocks.

Embodiment 148: In some embodiments, such as but not limited to embodiments 1-147, the articles includes, but is not limited to including, one or more anchor points.

Embodiment 149: In some embodiments, such as but not limited to embodiment 148, the base is present and base includes at least one of the one or more anchor points.

Embodiment 150: In some embodiments, such as, but not limited to, embodiment 149, at least one anchor point is a U shaped protrusion from a surface of the base and the surface is not a floor contact surface.

Embodiment 151: In some embodiments, such as, but not limited to, embodiment 149, at least one anchor point is a loop or circular shaped protrusion from a surface of the base and the surface is not a floor contact surface.

Embodiment 152: In some embodiments, such as, but not limited to, embodiments 149-151, the base includes at least two anchor points.

Embodiment 153: In some embodiments, such as, but not limited to, embodiments 149-152, the base includes four anchor points arranged about 90 degrees apart around the base.

Embodiment 154: In some embodiments, such as but not limited to embodiments 1-153, the base is present.

Embodiment 155: In some embodiments, such as but not limited to embodiment 154, the base includes, but not limited to including, a first surface and a second surface.

Embodiment 156: In some embodiments, such as but not limited to embodiment 155, the first surface of the base is planar or approximately a plane (variation of ±5%).

Embodiment 157: In some embodiments, such as but not limited to embodiment 155, the first surface of the base and the second surface of the base are parallel with each other or within 20 degrees of being parallel with each other.

Embodiment 158: In some embodiments, such as but not limited to embodiments 155-157, the first surface of the base is a floor contact surface.

Embodiment 159: In some embodiments, such as but not limited to embodiments 154-158, the third dimension (z axis as illustrated in FIG. 1) of the base of the article is not more than 25% of the equivalent diameter of the surface area of the first surface.

Embodiment 160: In some embodiments, such as but not limited to embodiments 154-158, the third dimension (z axis as illustrated in FIG. 1) of the base of the article is not more than 20% of the equivalent diameter of the surface area of the first surface.

Embodiment 161: In some embodiments, such as but not limited to embodiments 154-158, the third dimension (z axis as illustrated in FIG. 1) of the base of the article is not more than 18% of the equivalent diameter of the surface area of the first surface.

Embodiment 162: In some embodiments, such as but not limited to embodiments 154-158, the third dimension (z axis as illustrated in FIG. 1) of the base of the article is not more than 15% of the equivalent diameter of the surface area of the first surface.

Embodiment 163: In some embodiments, such as but not limited to embodiments 154-158, the third dimension (z axis as illustrated in FIG. 1) of the base of the article is not more than 12% of the equivalent diameter of the surface area of the first surface.

Embodiment 164: In some embodiments, such as but not limited to embodiments 154-158, the third dimension (z axis as illustrated in FIG. 1) of the base of the article is not more than 10% of the equivalent diameter of the surface area of the first surface.

Embodiment 165: In some embodiments, such as but not limited to embodiments 154-158, the third dimension (z axis as illustrated in FIG. 1) of the base of the article is not more than 8% of the equivalent diameter of the surface area of the first surface.

Embodiment 166: In some embodiments, such as but not limited to embodiments 154-158, the third dimension (z axis as illustrated in FIG. 1) of the base of the article is not more than 5% of the equivalent diameter of the surface area of the first surface.

Embodiment 167: In some embodiments, such as but not limited to embodiments 154-158, the third dimension (z axis as illustrated in FIG. 1) of the base of the article is not more than 2.5% of the equivalent diameter of the surface area of the first surface.

Embodiment 168: In some embodiments, such as but not limited to embodiments 154-167, the third dimension (z axis as illustrated in FIG. 1) of the base of the article is not less than 0.01% of the equivalent diameter of the surface area of the first surface.

Embodiment 169: In some embodiments, such as but not limited to embodiments 154-168, the third dimension (z axis as illustrated in FIG. 1) of the base of the article is not more than 25% of the average of dimensions in the other axes (x and y axes) and/or equivalent diameter of the base.

Embodiment 170: In some embodiments, such as but not limited to embodiments 154-168, the third dimension (z axis as illustrated in FIG. 1) of the base of the article is not more than 20% of the average of dimensions in the other axes (x and y axes) and/or equivalent diameter of the base.

Embodiment 171: In some embodiments, such as but not limited to embodiments 154-168, the third dimension (z axis as illustrated in FIG. 1) of the base of the article is not more than 18% of the average of dimensions in the other axes (x and y axes) and/or equivalent diameter of the base.

Embodiment 172: In some embodiments, such as but not limited to embodiments 154-168, the third dimension (z axis as illustrated in FIG. 1) of the base of the article is not more than 15% of the average of dimensions in the other axes (x and y axes) and/or equivalent diameter of the base.

Embodiment 173: In some embodiments, such as but not limited to embodiments 154-168, the third dimension (z axis as illustrated in FIG. 1) of the base of the article is not more than 12% of the average of dimensions in the other axes (x and y axes) and/or equivalent diameter of the base.

Embodiment 174: In some embodiments, such as but not limited to embodiments 154-168, the third dimension (z axis as illustrated in FIG. 1) of the base of the article is not more than 10% of the average of dimensions in the other axes (x and y axes) and/or equivalent diameter of the base.

Embodiment 175: In some embodiments, such as but not limited to embodiments 154-168, the third dimension (z axis as illustrated in FIG. 1) of the base of the article is not more than 8% of the average of dimensions in the other axes (x and y axes) and/or equivalent diameter of the base.

Embodiment 176: In some embodiments, such as but not limited to embodiments 154-168, the third dimension (z axis as illustrated in FIG. 1) of the base of the article is not more than 5% of the average of dimensions in the other axes (x and y axes) and/or equivalent diameter of the base.

Embodiment 177: In some embodiments, such as but not limited to embodiments 154-168, the third dimension (z axis as illustrated in FIG. 1) of the base of the article is not more than 2.5% of the average of dimensions in the other axes (x and y axes) and/or equivalent diameter of the base.

Embodiment 178: In some embodiments, such as but not limited to embodiments 169-177, the third dimension (z axis as illustrated in FIG. 1) of the base of the article is not less than 0.01% of the average of dimension in the other axes (x and y axes) and/or equivalent diameter of the base.

Embodiment 179: In some embodiments, such as but not limited to embodiments 149-178, the base comprises one or more through holes.

Embodiment 180: In some embodiments, such as, but not limited to, embodiment 179, the through holes are 10% to 50% of the surface area of the base or at least one piece of the base, if the base is multiple pieces.

Embodiment 181: In some embodiments, such as, but not limited to, embodiment 179, the through holes are 10% to 25% of the surface area of the base or at least one piece of the base, if the base is multiple pieces.

Embodiment 182: In some embodiments, such as, but not limited to, embodiment 179, the through holes are 15% to 35% of the surface area of the base or at least one piece of the base, if the base is multiple pieces.

Embodiment 183: In some embodiments, such as, but not limited to, embodiment 179, the through holes are 10% to 20% of the surface area of the base or at least one piece of the base, if the base is multiple pieces.

Embodiment 184: In some embodiments, such as, but not limited to, embodiment 179, the through holes are 10% to 50% of the surface area of the base or at least one piece of the base, if the base is multiple pieces.

Embodiment 185: In some embodiments, such as, but not limited to, embodiments 179-184, for the base or at least one piece of the base including, but not limited to including, through holes, fewer than 5% of the through holes intersect another through hole.

Embodiment 186: In some embodiments, such as, but not limited to, embodiment 179, the base (or at least one piece of the base if the base is multiple pieces) has a porosity in the range of 10% to 55%.

Embodiment 187: In some embodiments, such as, but not limited to, embodiment 179, the base (or at least one piece of the base if the base is multiple pieces) has a porosity in the range of 15% to 55%.

Embodiment 188: In some embodiments, such as, but not limited to, embodiment 179, the base (or at least one piece of the base if the base is multiple pieces) has a porosity in the range of 20% to 55%.

Embodiment 189: In some embodiments, such as, but not limited to, embodiment 179, the base (or at least one piece of the base if the base is multiple pieces) has a porosity in the range of 10% to 45%.

Embodiment 190: In some embodiments, such as, but not limited to, embodiment 179, the base (or at least one piece of the base if the base is multiple pieces) has a porosity in the range of 10% to 35%.

Embodiment 191: In some embodiments, such as, but not limited to, embodiment 179, the base (or at least one piece of the base if the base is multiple pieces) has a porosity in the range of 10% to 25%.

Embodiment 192: In some embodiments, such as, but not limited to, embodiment 179, the base (or at least one piece of the base if the base is multiple pieces) has a porosity in the range of 15% to 30%.

Embodiment 193: In some embodiments, such as, but not limited to, embodiments 179-192, at least some of the through-holes are circular or nearly circular with a diameter in the range of 5 to 10 cm.

Embodiment 194: In some embodiments, such as, but not limited to, embodiments 179-192, at least some of the through-holes are circular or nearly circular with a diameter in the range of 5 to 15 cm.

Embodiment 195: In some embodiments, such as but not limited to embodiments 149-194, the base comprises two or more base pieces.

Embodiment 196: In some embodiments, such as but not limited to embodiments 149-195, the base, or at least one piece of the base, and at least one of the one or more support members are integrated to form a single piece.

Embodiment 197: In some embodiments, such as but not limited to embodiments 149-196, the base comprises one or more materials, the one or more materials being material used for construction of items intended for seawater submersion.

Embodiment 198: In some embodiments, such as but not limited to embodiments 149-196, the base comprises one or more materials, the one or more materials being materials used for artificial reefs.

Embodiment 199: In some embodiments, such as but not limited to embodiments 149-196, the base comprises one or more materials, the one or more materials including, but not limited to including, natural fibers and/or pure cement without chemical additives.

Embodiment 200: In some embodiments, such as but not limited to embodiments 149-196, the base comprises one or more materials, the one or more materials including, but not limited to including, concrete.

Embodiment 201: In some embodiments, such as, but not limited to, embodiment 200, the concrete is reinforced with steel, natural fibers, one or more metals, rocks, or any combination thereof.

Embodiment 202: In some embodiments, such as, but not limited to, embodiments 200 and 201, the concrete is steel reinforced concrete.

Embodiment 203: In some embodiments, such as, but not limited to, embodiments 200-202, the concrete is a precast concrete used for manufacturing in molds.

Embodiment 204: In some embodiments, such as, but not limited to, embodiment 200-203, the concrete is not a sprayable concrete.

Embodiment 205: In some embodiments, such as, but not limited to, embodiment 200-204, wherein the concrete is of neutral pH.

Embodiment 206: In some embodiments, such as, but not limited to, embodiment 200-205, wherein the concrete has high durability and resistance due to the including, but not limited to including, a high proportion (at least 20 wt % of formed concrete) of rocks.

Embodiment 207: In some embodiments, such as but not limited to embodiments 1-206, the article is free of synthetic polymers.

Embodiment 208: In some embodiments, such as but not limited to embodiments 1-207, the article is free of magnetic particles.

Embodiment 209: In some embodiments, such as but not limited to embodiments 1-208, the article is free of wood except for cellulose fibers, rayon fibers, or other natural fibers derived from wood, that may be included, individually or in combination, in the natural fibers in the top and the natural fibers may include other types of natural fibers.

Embodiment 210: In some embodiments, such as but not limited to embodiments 1-209, the base, if present, the one or more support members, the top, or any combination thereof are free of exterior coatings.

Embodiment 211: In some embodiments, such as but not limited to embodiments 1-210, if multiple support members are present, all support members include, but are not limited to including, concrete, and the base, if present, includes, but is not limited to including, concrete, and the top includes, but is not limited to including, concrete, and the concrete of the top is different from the concrete of the base and the support member(s).

Embodiment 212: In some embodiments, such as but not limited to embodiments 149-211, the base is a disk shape, the support is in the shape of a tapered column being of larger cross-sectional area at the connection with the base than at the connection at the top and of a height equal to or greater than the diameter of the disk of the base, the support being connected to the base at an angle of 90±5 degrees, and the projected area of the top onto the floor a circular shape of a diameter within 5% of the diameter of the disk of the base where the disk and circular shape do not need to be mathematically perfect shapes.

Embodiment 213: In some embodiments, such as but not limited to embodiments 1-212, the largest projected area of the article in a plane perpendicular to the floor is 50% of the perpendicular area, where the perpendicular area is defined herein.

Embodiment 214: In some embodiments, such as but not limited to embodiments 1-212, the largest projected area of the article in a plane perpendicular to the floor is 40% of the perpendicular area, where the perpendicular area is defined herein.

Embodiment 215: In some embodiments, such as but not limited to embodiments 1-212, the largest projected area of the article in a plane perpendicular to the floor is 35% of the perpendicular area, where the perpendicular area is defined herein.

Embodiment 216: In some embodiments, such as but not limited to embodiments 1-212, the largest projected area of the article in a plane perpendicular to the floor is 30% of the perpendicular area, where the perpendicular area is defined herein.

Embodiment 217: In some embodiments, such as but not limited to embodiments 1-212, the largest projected area of the article in a plane perpendicular to the floor is 25% of the perpendicular area, where the perpendicular area is defined herein.

Embodiment 218: In some embodiments, such as but not limited to embodiments 1-212, the largest projected area of the article in a plane perpendicular to the floor is 20% of the perpendicular area, where the perpendicular area as defined herein.

Embodiment 219: In some embodiments, such as but not limited to embodiments 1-218, the middle section with only support member(s) is at least 50% of the total height, and not more than 98% of the total height.

Embodiment 220: In some embodiments, such as but not limited to embodiments 1-218, the middle section with only support member(s) is at least 60% of the total height, and not more than 98% of the total height.

Embodiment 221: In some embodiments, such as but not limited to embodiments 1-218, the middle section with only support member(s) is at least 65% of the total height, and not more than 98% of the total height.

Embodiment 222: In some embodiments, such as but not limited to embodiments 1-218, the middle section with only support member(s) is at least 70% of the total height, and not more than 98% of the total height.

Embodiment 223: In some embodiments, such as but not limited to embodiments 1-218, the middle section with only support member(s) is at least 75% of the total height, and not more than 98% of the total height.

Embodiment 224: In some embodiments, such as but not limited to embodiments 1-218, the middle section with only support member(s) is at least 80% of the total height, and not more than 98% of the total height.

Embodiment 225: In some embodiments, such as but not limited to embodiments 1-218, the middle section with only support member(s) is at least 85% of the total height, and not more than 98% of the total height.

Embodiment 226: In some embodiments, such as but not limited to embodiments 1-218, for a contiguous middle portion of the article of at least 50% of the total height, and not more than 98% of the total height, at least 85% of the hydrodynamic drag is due to the support members.

Embodiment 227: In some embodiments, such as but not limited to embodiments 1-218, for a contiguous middle portion of the article of at least 50% of the total height, and not more than 98% of the total height, at least 65% of the hydrodynamic drag is due to the support members.

Embodiment 228: In some embodiments, such as but not limited to embodiments 1-218, for a contiguous middle portion of the article of at least 50% of the total height, and not more than 98% of the total height, at least 85% of the hydrodynamic drag is due to the support members.

Embodiment 229: In some embodiments, such as but not limited to embodiments 1-218, for a contiguous middle portion of the article of at least 70% of the total height, and not more than 98% of the total height, at least 85% of the hydrodynamic drag is due to the support members.

Embodiment 230: In some embodiments, such as but not limited to embodiments 1-218, for a contiguous middle portion of the article of at least 75% of the total height, and not more than 98% of the total height, at least 85% of the hydrodynamic drag is due to the support members.

Embodiment 231: In some embodiments, such as but not limited to embodiments 1-218, for a contiguous middle portion of the article of at least 80% of the total height, and not more than 98% of the total height, at least 85% of the hydrodynamic drag is due to the support members.

Embodiment 232: In some embodiments, such as but not limited to embodiments 1-218, for a contiguous middle portion of the article of at least 85% of the total height, and not more than 98% of the total height, at least 85% of the hydrodynamic drag is due to the support members.

Embodiment 233: In some embodiments, such as but not limited to embodiments 1-218, for a contiguous middle portion of the article of at least 90% of the total height, and not more than 98% of the total height, at least 85% of the hydrodynamic drag is due to the support members.

Embodiment 234: In some embodiments, such as but not limited to embodiments 1-233, the top section is at least 1% of the total height, and not more than 30%.

Embodiment 235: In some embodiments, such as but not limited to embodiments 1-233, the top section is at least 1% of the total height, and not more than 25%.

Embodiment 236: In some embodiments, such as but not limited to embodiments 1-233, the top section is at least 1% of the total height, and not more than 22%.

Embodiment 237: In some embodiments, such as but not limited to embodiments 1-233, the top section is at least 1% of the total height, and not more than 20%.

Embodiment 238: In some embodiments, such as but not limited to embodiments 1-233, the top section is at least 1% of the total height, and not more than 18%.

Embodiment 239: In some embodiments, such as but not limited to embodiments 1-233, the top section is at least 1% of the total height, and not more than 16%.

Embodiment 240: In some embodiments, such as but not limited to embodiments 1-233, the top section is at least 1% of the total height, and not more than 14%.

Embodiment 241: In some embodiments, such as but not limited to embodiments 149-240, the base section is at least 1% of the total height, and not more than 22%.

Embodiment 242: In some embodiments, such as but not limited to embodiments 149-240, the base section is at least 1% of the total height, and not more than 20%.

Embodiment 243: In some embodiments, such as but not limited to embodiments 149-240, the base section is at least 1% of the total height, and not more than 18%.

Embodiment 244: In some embodiments, such as but not limited to embodiments 149-240, the base section is at least 1% of the total height, and not more than 15%.

Embodiment 245: In some embodiments, such as but not limited to embodiments 149-240, the base section is at least 1% of the total height, and not more than 10%.

Embodiment 246: In some embodiments, such as but not limited to embodiments 149-240, the base section is at least 1% of the total height, and not more than 8%.

Embodiment 247: In some embodiments, such as but not limited to embodiments 1-246, the total height is about 1 meter, the equivalent diameter of the top is about 1 meter, and the equivalent diameter of the base, if present, is about 1 meter, where about means±10% here.

Embodiment 248: In some embodiments, such as but not limited to embodiments 1-246, the total height of the article is about 2 meters, the equivalent diameter of the top is about 2 meters, and the equivalent diameter of the base, if present, is about 2 meters, where about means±10% here.

Embodiment 249: In some embodiments, such as but not limited to embodiments 1-246, the total height of the article is about 3 meters, the equivalent diameter of the top is about 2 meters, and the equivalent diameter of the base, if present, is about 2 meters, where about means±10% here.

Embodiment 250: In some embodiments, such as but not limited to embodiments 1-246, the total height of the article is greater than 3 meters, the equivalent diameter of the top is at least 2 meters, and the equivalent diameter of the base, if present, is at least 2 meters.

Embodiment 251: An artificial reef comprising two or more units, each unit being an article, such as, but not limited to, any of those described in embodiments 1-250, each unit being connected to at least one other unit.

Embodiment 252: In some embodiments, the artificial reef, such as but not limited to that described in embodiment 251, comprises units that do not vary in height by more than 5%.

Embodiment 253: In some embodiments, the artificial reef, such as but not limited to that described in embodiment 251, comprises units that vary in height.

Embodiment 254: In some embodiments, such as but not limited to those described in embodiments 1-253, any reference to "total height" of an article excludes any optional deployment link present on the article.

Embodiment 255: In some embodiments, such as but not limited to those described in embodiments 1-254, any reference to the composition, permeability, and/or porosity of the top, one or more support member(s), and/or base, if present, is the composition as manufactured prior to placement into water.

While particular embodiments of the present invention have been shown and described, it will be obvious to those skilled in the art that changes and modifications can be made without departing from this invention in its broader aspects. Therefore, the claims are to encompass within their scope all such changes and modifications as fall within the true sprit and scope of this invention. Moreover, although individual aspects or features may have been presented with respect to one embodiment, a recitation of an aspect for one embodiment, or the recitation of an aspect in general, is intended to disclose its use in all embodiments in which that aspect or feature can be incorporated without undue experimentation. Also, embodiments of the present invention specifically encompass embodiments resulting from treating any dependent claim that follows as alternatively written in a multiple dependent form from all prior claims that possess all antecedents referenced in such dependent claim (e.g. each claim depending directly from claim 1 should be alternatively taken as depending from any previous claims).

What is claimed is:

1. An article comprising:
    a top, the water permeability of the top being between 1000 to 5000 millidarcy, wherein the top is in the shape of a sphere section, hemisphere, or dome, and wherein the top comprises a U-shaped deployment link;
    one or more support columns, each support column comprising a first end and a second end, the first end of the one or more support columns being connected to the top;
    a base comprising at least one of the one or more support columns being connected to the base; and
    at least one reinforcement rod at least partially disposed within the base and extending outwardly in a radial direction from a center of the base, wherein:
        the one or more support columns and the base are cast together in concrete as an integral pre-cast concrete unit,
        an outer end of each reinforcement rod comprises a rigid U-shaped anchor point protruding away from the center of the base,
        the base comprises a top surface connected to at least one of the one or more support columns, a bottom surface being configured for contact with a floor, and at least one lateral surface, wherein the U-shaped anchor points protrude outwardly from the lateral surface, wherein at least one of the U-shaped anchor points is configured to be linked to an anchor point of a second article forming a collection of articles, at least one of the one or more support columns comprises a plurality of through holes making right angles with the top and bottom surfaces, and at least some of the through holes are circular or substantially circular with a diameter in the range of 5 cm to 10 cm so as to allow fluid to pass therethrough and reduce hydrodynamic dragging of the article by strong currents,
        the base further comprises one or more of at least one hole or at least one cavity, and
        wherein the base is substantially disc shaped and has a diameter that is substantially larger than the diameter of each of the one or more support columns such that the base is configured to distribute the weight to limit sinking into the floor.

2. The article of claim 1, wherein the top has a porosity of at least 10% and not more than 45%.

3. The article of claim 1, wherein the top comprises at least 30 wt % of CaCO3.

4. The article of claim 1, wherein the top comprises at least one of natural fibers and artificial fibers.

5. The article of claim 4, wherein the natural fibers comprise cotton, silk, hemp, flax, wood pulp, or a combination thereof.

6. The article of claim 1, wherein the article comprises a floor contact area, and a projected area of the top of the article, when projected on the floor, is 70% to 130% of the floor contact area.

7. The article of claim 1, wherein the average cross-sectional area of the support column or the sum of the average cross-sectional area of the support members-columns is not more than 25% of the projected area of the top when projected on the floor.

8. The article of claim 1, wherein the plurality of through holes are 10% to 50% of the surface area of the support column.

9. The article of claim 1, wherein the top comprises two or more top pieces.

10. The article of claim 1, wherein the height of the base is less than 20% of the equivalent diameter of a first surface of the base.

11. The article of claim 1, wherein the base comprises two or more base pieces.

12. The article of claim 1, wherein the top comprises concrete.

13. The article of claim 12, wherein at least one of the one or more support columns is in the shape of a tapered column being of larger dimension at the connection with the base than at the connection at the top and of a height equal to or greater than 0.75% of the diameter of the disc of the base, and the projected area of the top onto the floor being a circle or substantially a circle, with the equivalent diameter of the projected area of the top onto the floor being within 5% of the equivalent diameter of the base.

14. An artificial reef comprising two or more articles, wherein each article comprises:
    a top, the water permeability of the top being between 1000 to 5000 millidarcy, wherein the top is in the shape of a sphere section, hemisphere, or dome, and wherein the top comprises a U-shaped deployment link;
    one or more support columns, each support column comprising a first end connected to the top, and a second end connected to a base; and
    at least one reinforcement rod at least partially disposed within the base and extending outwardly in a radial direction from a center of the base, wherein:
        the one or more support columns and the base are cast together in concrete as an integral pre-cast concrete unit, wherein an outer end of each reinforcement rod comprises a rigid anchor point protruding away from the center of the base, wherein the base comprises a top surface connected to at least one of the one or more support columns, a bottom surface being configured for contact with a floor, and at least one lateral surface, wherein the rigid anchor points protrude outwardly from the lateral surface, wherein at least one of the rigid anchor points is linked to an anchor point of a second article forming a collection of articles, at least one of the one or more support columns comprises a plurality of through holes making right angles with the top and bottom surfaces, and at least some of the through holes are circular or substantially circular with a diameter in the range of 5 cm to 10 cm so as to allow fluid to pass therethrough and reduce hydrodynamic dragging of the article by strong currents, the base further comprises one or more of at least one hole or at least one cavity, and the base is substantially disc shaped and has a diameter that is substantially larger than the diameter of each of the one or more support columns such that the base is configured to distribute the weight to limit sinking into the floor.

\* \* \* \* \*